US007675592B2

(12) United States Patent
Ochiai et al.

(10) Patent No.: US 7,675,592 B2
(45) Date of Patent: Mar. 9, 2010

(54) TRANSFLECTIVE LIQUID CRYSTAL DISPLAY DEVICE

(75) Inventors: Takahiro Ochiai, Chiba (JP); Takayuki Nakao, Atsugi (JP); Daisuke Sonoda, Chiba (JP); Hidekazu Miyake, Mobara (JP); Toshio Miyazawa, Chiba (JP); Masahiro Maki, Mobara (JP); Tohru Sasaki, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 172 days.

(21) Appl. No.: 11/812,770

(22) Filed: Jun. 21, 2007

(65) Prior Publication Data

US 2008/0007679 A1 Jan. 10, 2008

(30) Foreign Application Priority Data

Jul. 7, 2006 (JP) .............................. 2006-188258

(51) Int. Cl.
*G02F 1/1335* (2006.01)
*G02F 1/1343* (2006.01)
(52) U.S. Cl. ...................................... 349/114; 349/141
(58) Field of Classification Search ................. 349/114, 349/141
See application file for complete search history.

(56) References Cited

U.S. PATENT DOCUMENTS

| 7,450,202 | B2* | 11/2008 | Tsuchiya | 349/114 |
| 7,502,084 | B2* | 3/2009 | Nishimura | 349/114 |
| 2005/0264731 | A1* | 12/2005 | Itou et al. | 349/114 |
| 2006/0050209 | A1* | 3/2006 | Higa | 349/114 |

(Continued)

FOREIGN PATENT DOCUMENTS

JP 5-127195 11/1991

(Continued)

OTHER PUBLICATIONS

U.S. Appl. No. 11/783,071, filed Apr. 5, 2007, Ochial et al.

*Primary Examiner*—K. Cyrus Kianni
(74) *Attorney, Agent, or Firm*—Stites & Harbison PLLC; Juan Carlos A. Marquez, Esq.

(57) ABSTRACT

The manufacturing yield of transflective liquid crystal display devices is to be enhanced. In a transflective liquid crystal display device including a liquid crystal display panel having a pair of substrates and a liquid crystal layer held between the pair of substrates, the liquid crystal display panel has a plurality of subpixels each having a transmissive part and a reflective part, wherein one of the pair of substrates has: an active element; a first insulating film disposed in a higher layer than the electrode of the active element and having a first contact hole; a counter electrode disposed in a higher layer than the first insulating film; a reflective electrode disposed in the reflective part in a higher layer than the counter electrode; a second insulating film disposed in a higher layer than the counter electrode and the reflective electrode and having a second contact hole; a pixel electrode disposed in a higher layer than the second insulating film; and an electroconductor formed in the first contact hole and electrically connected to the electrode of the active element, and the pixel electrode is electrically connected to the electroconductor via the second contact hole.

20 Claims, 22 Drawing Sheets

U.S. PATENT DOCUMENTS

| | | |
|---|---|---|
| 2006/0050210 A1* | 3/2006 | Tsuchiya ............ 349/114 |
| 2006/0197894 A1* | 9/2006 | Higa et al. ............ 349/114 |
| 2006/0197898 A1* | 9/2006 | Kurasawa ............ 349/117 |
| 2007/0002226 A1* | 1/2007 | Sakamoto et al. ............ 349/114 |
| 2007/0103626 A1 | 5/2007 | Morimoto et al. |
| 2007/0241332 A1 | 10/2007 | Ochiai et al. |

FOREIGN PATENT DOCUMENTS

| | | |
|---|---|---|
| JP | 2006-109659 | 10/2004 |
| JP | 2007-127933 | 11/2005 |
| JP | 2007-286086 | 4/2006 |
| JP | 2007-41572 | 6/2006 |

* cited by examiner

A ——— A'

B ——— B'

(a)     (b)

(a)    (b)

G ——— G'

H ——— H'

TRANSFLECTIVE LIQUID CRYSTAL DISPLAY DEVICE

CLAIM OF PRIORITY

The present application claims priority from Japanese Application JP 2006-188258 filed on Jul. 7, 2006, the content of which is hereby incorporated by reference into this application.

BACKGROUND OF THE INVENTION

1. Field of the Invention

The present invention relates to transflective liquid crystal display devices, and more particularly to a transflective liquid crystal display device of an in-plane switching type or a vertical alignment type.

2. Description of the Related Art

Transflective liquid crystal display devices each having a transmissive part and a reflective part in one subpixel are used as display units for mobile devices.

Such transflective liquid crystal display devices use a system in which electric fields are applied to liquid crystals held between a pair of substrates in a direction normal to the planes of the paired substrates to drive the liquid crystals. In this case, to match the characteristics of the transmissive part and the reflective part, a level gap is provided between the transmissive part and the reflective part, and further a phase differential plate is arranged between a polarization plate and the liquid crystal layer.

On the other hand, IPS type transflective liquid crystal display devices are also known, in each of which pixel electrodes (PIX) and counter electrodes (CT) are formed over the same substrate, and gray scale levels are controlled by applying electric fields to these liquid crystals by rotating them within the substrate plane. For this reason, these devices have a significant feature that the relative shades of the display image are not reversed when the screen is looked at askew. To take advantage of this feature, it is proposed to structure a transflective liquid crystal display device by using an IPS type liquid crystal display device.

However, structuring a transflective liquid crystal display device by using an IPS type liquid crystal display device involves a problem (1) that, when the transmissive part is normally black, the reflective part becomes normally white, namely the relative shades are reversed between the transmissive part and the reflective part.

In view of this point, the present applicant has already applied for a patent on a transflective liquid crystal display device having a new pixel structure (see Japanese Patent Application No. 2005-322049) intended to solve this problem (1).

This transflective liquid crystal display device on which a patent is pending has a pixel structure for each subpixel in which an independent counter electrode for each of the transmissive part and the reflective part is provided against a common pixel electrode of the transmissive part and the reflective part, and reversal of the relative shades between them is prevented by applying different reference voltages (a counter voltage and a common voltage) to the transmissive part and the reflective part.

In the IPS type liquid crystal display device, the pixel electrode (PIX) is disposed on the liquid crystal side of one of the paired substrates. In this arrangement, a hole is bored in the counter electrode (CT), in which a contact hole is formed, and a driving voltage is applied to the pixel electrode (PIX) through this contact hole.

However, the transflective liquid crystal display device disclosed in Japanese Patent Application No. 2005-322049 involves a problem (2) that, in boring a hole in the counter electrode (CT) to apply a driving voltage to the pixel electrode (PIX) arranged on the liquid crystal side of one of the substrates and forming a contact hole therein, non-display parts increase and the transmissivity drops.

Therefore, to solve this problem (2), the present applicant has already applied for a patent on a transflective liquid crystal display device having a novel pixel structure (see Japanese Patent Application No. 2006-109659).

This transflective liquid crystal display device on which a patent is pending is intended to prevent the transmissivity from dropping by using the gap between opposing counter electrodes (CT) as the opening in the counter electrodes (CT) required for the formation of the contact hole.

SUMMARY OF THE INVENTION

The present inventors studied the transflective liquid crystal display device described in Japanese Patent Application No. 2006-109659, and found the following problems.

FIG. 23 shows the essential part of the sectional structure of the connecting part which electrically connects the electrode of an active element to a pixel electrode in the pixel part of the liquid crystal panel in the transflective liquid crystal display device of Japanese Patent Application No. 2006-109659, and FIG. 24, the essential part of the sectional structure of the connecting part which electrically connects the electrode of an active element to a counter electrode via an ITO film in the peripheral circuit part of the liquid crystal panel in the transflective liquid crystal display device whose application to the structure of Japanese Patent Application No. 2006-109659 is under consideration.

In FIG. 23 and FIG. 24, reference numerals 15, 16 and 17 denote inter-layer insulating films; reference sign CT denotes a counter electrode; DD and DD1, electrodes functioning as the drain electrodes of thin-film transistors (active elements); PIX, a pixel electrode; RAL, a reflective electrode; and CH2, CH3 and CH4, contact holes.

The transflective liquid crystal display device described in Japanese Patent Application No. 2006-109659, as shown in FIG. 23, has a structure in which the pixel electrode (PIX) is brought into direct contact with the electrode (DD) of a thin-film transistor via a contact hole CH3. This structure is realized by forming the inter-layer insulating film 17 inside the contact hole CH2 of the inter-layer insulating film 16 as well, boring a hole in this inter-layer insulating film 17 and utilizing its pattern to machine the inter-layer insulating film 15 underneath and thereby to bore the contact hole CH3.

However, when boring the contact hole CH3, the difference in film quality between the inter-layer insulating film 15 and the inter-layer insulating film 17 may invite some trouble in machining them together, which would result in faulty electrical connection of the pixel electrode (PIX) to the electrode (DD) of the thin-film transistor.

In view of this problem, the present inventors examined the possibility of machining the inter-layer insulating film 15 before machining the inter-layer insulating film 17. In this case, however, the electrode (DD) of the thin-film transistor was dissolved when the reflective electrode (RAL) was patterned, resulting again in faulty electrical connection of the pixel electrode (PIX) to the electrode (DD) of the thin-film transistor. This faulty connection invites a fall in the manufacturing yield of transflective liquid crystal display devices.

In the peripheral circuit part, controlling the potential to be supplied to the counter electrode (CT) with a thin-film transistor requires electrical connection between the electrode (DD1) of the thin-film transistor and the counter electrode (CT). Where the fabricating process described with reference to FIG. 23 is to be used, it is necessary to electrically connect the electrode (DD1) of the thin-film transistor and the counter electrode (CT) by using the top layer ITO film 20 (machined at the same step as the pixel electrode (PIX)) as shown in FIG. 24, and the increase in connection resistance due to the high chain resistance of the ITO poses a problem. An increased connection resistance gives rise to fluctuations in the driving voltage applied to the counter electrode (CT), which presumably invites deterioration in display quality.

An object of the present invention is to provide a technique which enables the manufacturing yield of transflective liquid crystal display devices to be enhanced.

Another object of the invention is to provide a technique which enables the display quality of transflective liquid crystal display devices to be improved.

These and other objects and novel features of the invention will become more apparent from the description in this specification when taken into conjunction with the accompanying drawings.

A brief summary of typical aspects of the invention disclosed in the present application is given below.

(1) A transflective liquid crystal display device includes a liquid crystal display panel having a pair of substrates and a liquid crystal layer held between the pair of substrates, the liquid crystal display panel having a plurality of subpixels each having a transmissive part and a reflective part, wherein one of the pair of substrates has: an active element; a first insulating film disposed in a higher layer than the electrode of the active element and having a first contact hole; a counter electrode disposed in a higher layer than the first insulating film; a reflective electrode disposed in the reflective part in a higher layer than the counter electrode; a second insulating film disposed in a higher layer than the counter electrode and the reflective electrode and having a second contact hole; a pixel electrode disposed in a higher layer than the second insulating film; and an electroconductor formed in the first contact hole and electrically connected to the electrode of the active element, and the pixel electrode is electrically connected to the electroconductor via the second contact hole.

(2) In the configuration described in (1) above, the electroconductor is disposed inside and outside the first contact hole all over.

(3) In the configuration described in (1) or (2) above, the one substrate has a third insulating film disposed in a higher layer than the electrode of the active element and in a lower layer than the first insulating film; the third insulating film has a third contact hole; and the electroconductor is electrically connected to the electrode of the active element via the first and third contact holes.

(4) In the configuration described in either one of (1) to (3) above, the electroconductor is formed at the same step as the counter electrode and electrically separated from the counter electrode.

(5) In the configuration described in either one of (1) to (4) above, the electrode of the active element contains in the surface thereof 1% or more of the material of the reflective electrode.

(6) In the configuration described in either one of (1) to (5) above, the electrode of the active element is formed of a material that is etched with the etchant or etching gas for the reflective electrode.

(7) In the configuration described in either one of (1) to (6) above, the pixel electrode is arranged superposed over the counter electrode, and the pixel electrode, the second insulating film and the counter electrode together constitute a holding capacitance.

(8) In the configuration described in either one of (1) to (7) above, each of the plurality of subpixels has the pixel electrode shared between the transmissive part and the reflective part and the counter electrodes independent for the transmissive part and the reflective part; and the driving voltages applied to the counter electrodes differ between the transmissive part and the reflective part.

(9) In the configuration described in either one of (1) to (7) above, the reflective part is provided with a phase differential plate.

(10) A transflective liquid crystal display device includes a liquid crystal display panel having a pair of substrates and a liquid crystal layer held between the pair of substrates, the liquid crystal display panel having a plurality of subpixels each having a transmissive part and a reflective part, wherein one of the pair of substrates has: an active element; a first insulating film disposed in a higher layer than the electrode of the active element and having a first contact hole; a common electrode in a higher layer than the first insulating film; a reflective electrode disposed in the reflective part in a higher layer than the common electrode; a second insulating film disposed in a higher layer than the common electrode and the reflective electrode and having a second contact hole; a pixel electrode disposed in a higher layer than the second insulating film; and an electroconductor formed in the first contact hole and electrically connected to the electrode of the active element, the pixel electrode being electrically connected to the electroconductor via the second contact hole.

(11) In the configuration described in (10) above, the electroconductor is disposed inside and outside the first contact hole all over.

(12) In the configuration described in (10) or (11) above, the one substrate has a third insulating film disposed in a higher layer than the electrode of the active element and in a lower layer than the first insulating film; the third insulating film has a third contact hole; and the electroconductor is electrically connected to the electrode of the active element via the first and third contact holes.

(13) In the configuration described in either one of (10) to (12) above, the electroconductor is formed at the same step as the common electrode and electrically separated from the common electrode.

(14) In the configuration described in either one of (10) to (13) above, the electrode of the active element contains in the surface thereof 1% or more of the material of the reflective electrode.

(15) In the configuration described in either one of (10) to (14) above, the electrode of the active element is formed of a material that is etched with the etchant or etching gas for the reflective electrode.

(16) In the configuration described in either one of (10) to (15) above, the pixel electrode is arranged superposed over the common electrode, and the pixel electrode, the second insulating film and the common electrode together constitute a holding capacitance.

(17) In the configuration described in either one of (10) to (16) above, the other of the pair of substrates has a counter electrode.

(18) A transflective liquid crystal display device includes a liquid crystal display panel having a pair of substrates and a liquid crystal layer held between the pair of substrates, the liquid crystal display panel having a plurality of subpixels each having a transmissive part and a reflective part, wherein one of the pair of substrates has: an active element which supplies a driving potential to a counter electrode; a first insulating film disposed in a higher layer than the electrode of the active element and having a first contact hole; and the counter electrode disposed in a higher layer than the first insulating film, the counter electrode being electrically connected to the electrode of the active element via the first contact hole.

(19) In the configuration described in (18) above, the subpixel has a reflective electrode in the reflective part; and a metal film formed at the same step as the reflective electrode is electrically connected to the counter electrode inside and outside the first contact hole all over.

Effects provided according to typical aspects of the invention disclosed in the present application are stated below.

According to the invention, it is made possible to achieve improvement of the display quality of transflective liquid crystal display devices while enhancing the manufacturing yield of transflective liquid crystal display devices.

BRIEF DESCRIPTION OF THE DRAWINGS

These and other features, objects and advantages of the present invention will become more apparent from the following description when taken in conjunction with the accompanying drawings wherein.

DESCRIPTION OF THE PREFERRED EMBODIMENTS

Embodiments of the present invention will be described in detail below with reference to accompanying drawings.

In all the drawings illustrating embodiments of the invention, elements having the same elements will be assigned respectively the same reference signs, and their description will not be duplicated.

Embodiment 1

Figure 11:
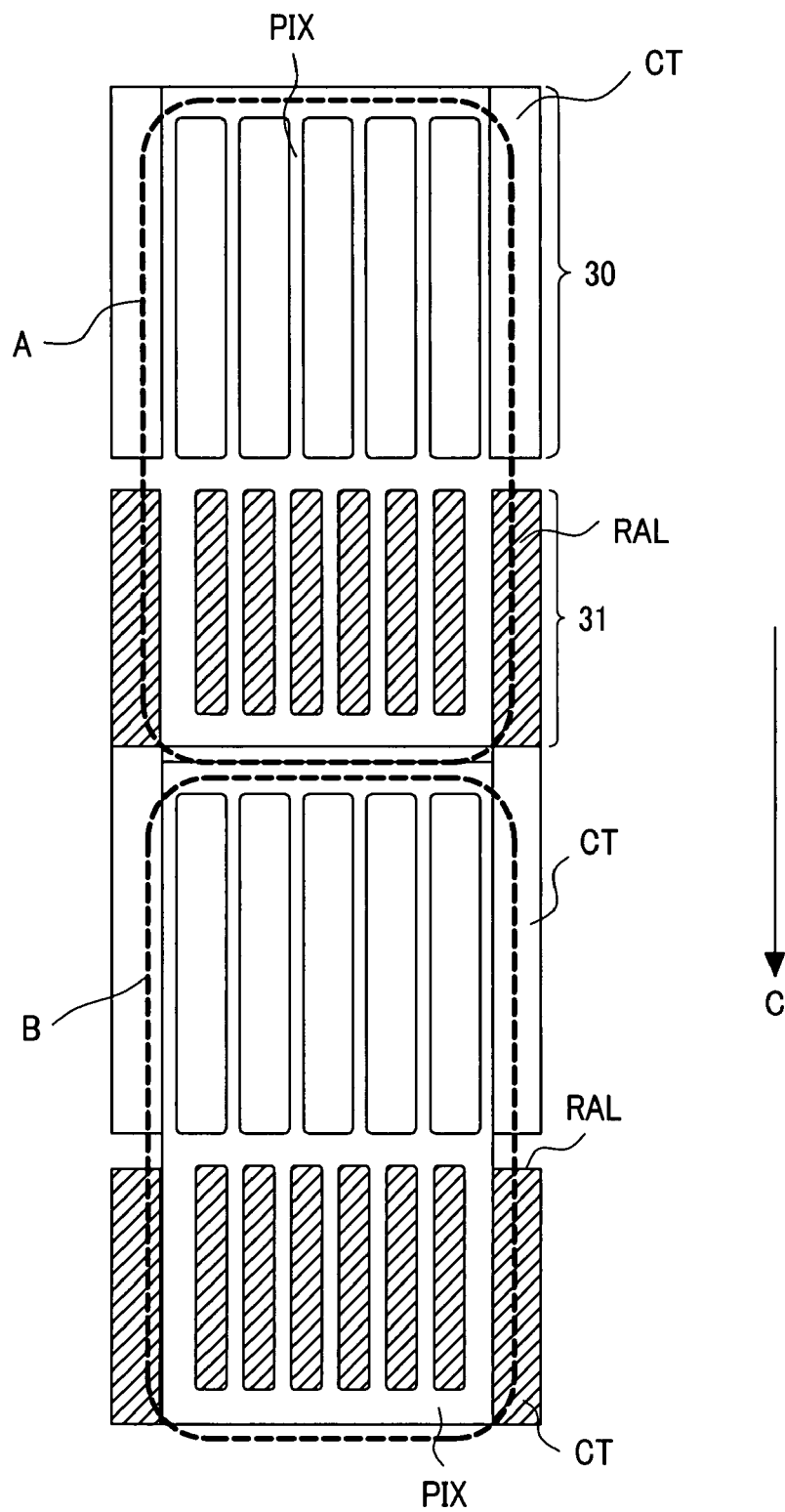
FIG. 11 shows a plan of the electrode structure of the subpixel in the transflective liquid crystal display device, which is the first embodiment of the invention.
Figure 12:
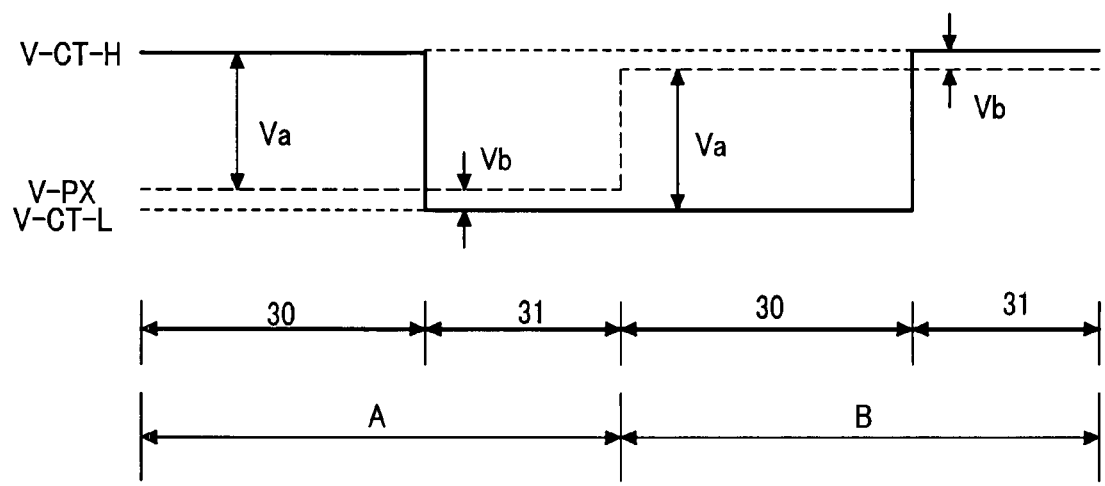
FIG. 12 shows the reference voltages to be applied to the counter electrode of the transmissive part and the counter electrode of the reflective part in the transflective liquid crystal display device of the first embodiment of the invention.

FIG. 11 and FIG. 12 pertain to a transflective liquid crystal display device, which is a first embodiment of the invention, wherein FIG. 11 is a plan showing the electrode structure of the subpixel and FIG. 12, the reference voltages to be applied to the counter electrode of the transmissive part and the counter electrode of the reflective part.

In FIG. 11, reference numeral 30 denotes a transmissive part which constitutes a transflective liquid crystal display panel, and 31, a reflective part which constitutes an irregularly reflective liquid crystal display panel. It has to be noted here that the transmissive part 30 is normally black and the reflective part 31 is normally white.

In this embodiment, while the pixel electrode (PIX) is common in each subpixel, each-of the transmissive part 30 and the reflective part 31 has an independent counter electrode (CT). Thus a counter electrode (CT) is bisected into portions one each for the transmissive part 30 and for the reflective part 31. A reflective electrode (RAL) is formed over the counter electrode (CT) of the reflective part 31.

Incidentally, FIG. 11 shows a-configuration in which the counter electrode (CT) of the reflective part 31 on one display line (the display line having the subpixel indicated by A in FIG. 11) out of two adjoining display lines and the counter electrode (CT) of the transmissive part 30 on the other display line (the display line having the subpixel indicated by B in FIG. 11) are formed of a common electrode. Arrow C in FIG. 11 indicates the scanning direction.

And as shown in FIG. 12, different reference voltages are applied to the counter electrode (CT) of the transmissive part 30 and the counter electrode (CT) of the reflective part 31 in each subpixel.

For instance in the subpixel indicated by A in FIG. 11, a high level (hereinafter referred to as H-level) reference voltage (V-CT-H) is applied to the counter electrode (CT) of the transmissive part 30, and a low level (hereinafter referred to as L-level) reference voltage (V-CT-L) is applied to the counter electrode (CT) of the reflective part 31.

Further in this subpixel indicated by A in FIG. 11, an image voltage (V-PX) whose polarity is negative as viewed with respect to the transmissive part 30 and positive as viewed with respect to the reflective part 31 is applied to the pixel electrode (PIX). Incidentally, the negative polarity in this context means that the potential of the pixel electrode (PIX) is lower than the potential of the counter electrode (CT), irrespective of whether the potential of the pixel electrode (PIX) is higher or lower than 0 V. Similarly, the positive polarity in this context means that the potential of pixel electrode (PIX) is higher than the potential of the counter electrode (CT), irrespective of whether the potential of the pixel electrode (PIX) is higher or lower than 0 V.

Similarly, in the subpixel indicated by B in FIG. 11, an L-level reference voltage (V-CT-L) is applied to the counter electrode (CT) of the transmissive part 30, and an H-level reference voltage (V-CT-H) is applied to the counter electrode (CT) of the reflective part 31. Further in this subpixel indicated by B in FIG. 11, an image voltage (V-PX) whose polarity is positive as viewed with respect to the transmissive part 30 and negative as viewed with respect to the reflective part 31 is applied to the pixel electrode (PIX).

The image voltage (V-PX) applied to the pixel electrode (PIX) here is a potential positioned between the H-level reference voltage (V-CT-H) and the L-level reference voltage (V-CT-L).

Therefore, in the subpixels indicated by A and B in FIG. 11, the potential difference between the pixel electrode (PIX) and the counter electrode (CT) (Va in FIG. 12) widens in the transmissive part 30, and the potential difference between the pixel electrode (PIX) and the counter electrode (CT) (Vb in FIG. 12) narrows in the reflective part 31.

For this reason, while the potential shown in FIG. 12 is being applied, brightness increases in the transmissive part 30 because the potential difference Va between the pixel electrode (PIX) and the counter electrode (CT) is great. Then in the reflective part 31, brightness also increases because the potential difference Vb between the pixel electrode (PIX) and the counter electrode (CT) is small.

And when the potential of the pixel electrode (PIX) (the potential of image signals) is varied to a different level from FIG. 12 and the potential difference Va between the pixel electrode (PIX) and the counter electrode (CT) is further increased in the transmissive part 30, both the transmissive part 30 and the reflective part 31 become even brighter as the potential difference Vb between the pixel electrode (PIX) and the counter electrode (CT) in the reflective part 31 further narrows.

Conversely, when the potential of the pixel electrode (PIX) (the potential of image signals) is varied to a different level from FIG. 12 and the potential difference Va between the pixel electrode (PIX) and the counter electrode (CT) is narrowed in the transmissive part 30, both the transmissive part 30 and the reflective part 31 darken as the potential difference Vb between the pixel electrode (PIX) and the counter electrode (CT) widens in the reflective part 31.

Since the counter electrode (CT) is bisected into portions one each for the transmissive part and the reflective part in each subpixel and reference voltages reverse to each other in polarity (incidentally the reverse polarities in this context mean that when one is at the H-level the other is at the L-level) are applied to the counter electrode (CT) of the transmissive part 30 and the counter electrode (CT) of the reflective part 31, the reversal of relative brightness between the transmissive part 30 and the reflective part 31 can be prevented. Thus, even though the transmissive part 30 is normally black and the reflective part 31 is normally white, the problem of reversal of relative brightness is solved by contriving the way of applying the voltage to the counter electrode (CT) of the reflective part 31.

Figure 1A:
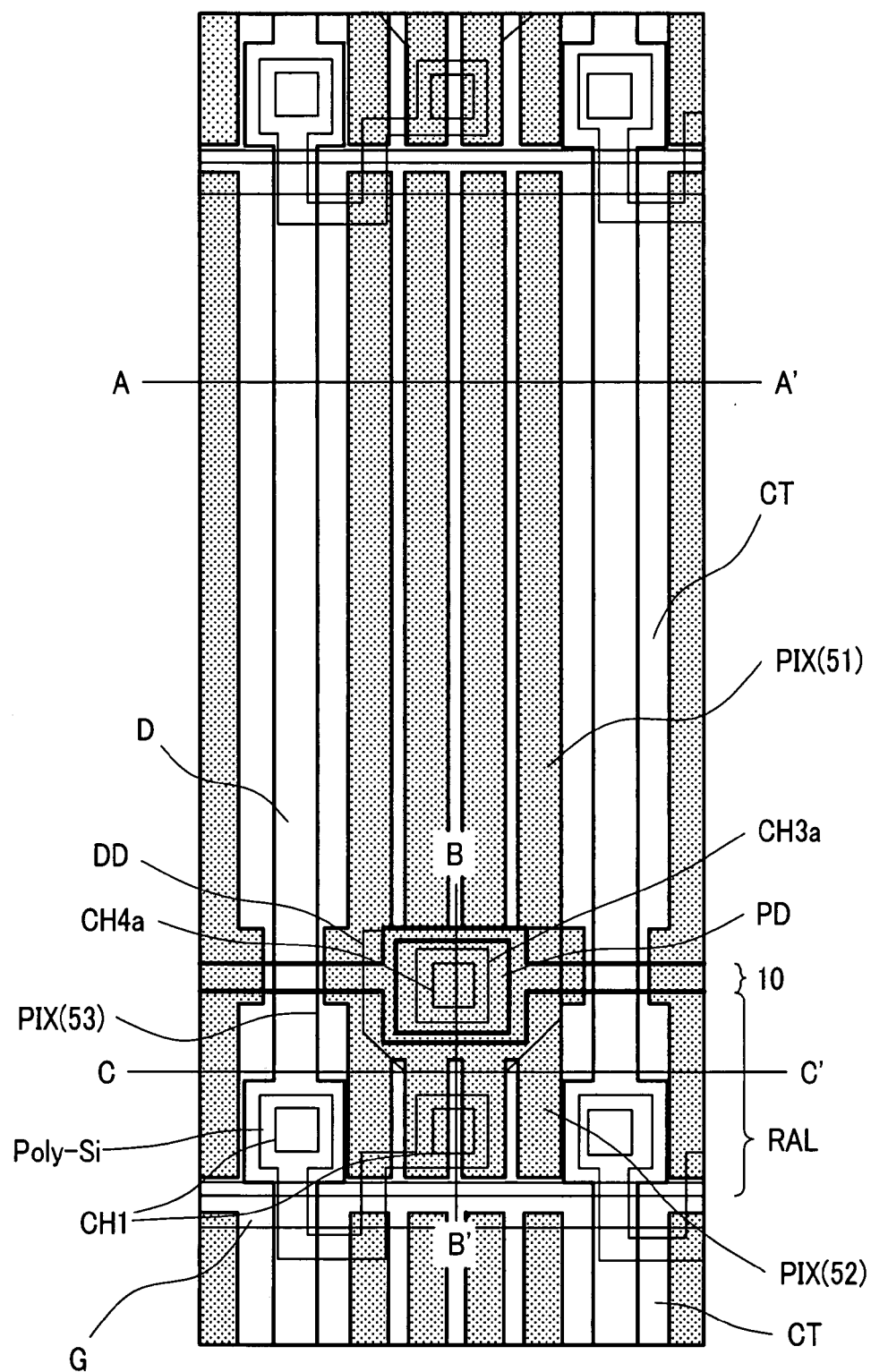
FIG. 1A shows a plan of the electrode structure of the subpixel in a transflective liquid crystal display device, which is a first embodiment of the present invention.

FIG. 1A shows a plan of the electrode structure of the subpixel in the transflective liquid crystal display device, which is a first embodiment of the present invention.

Figure 1B:
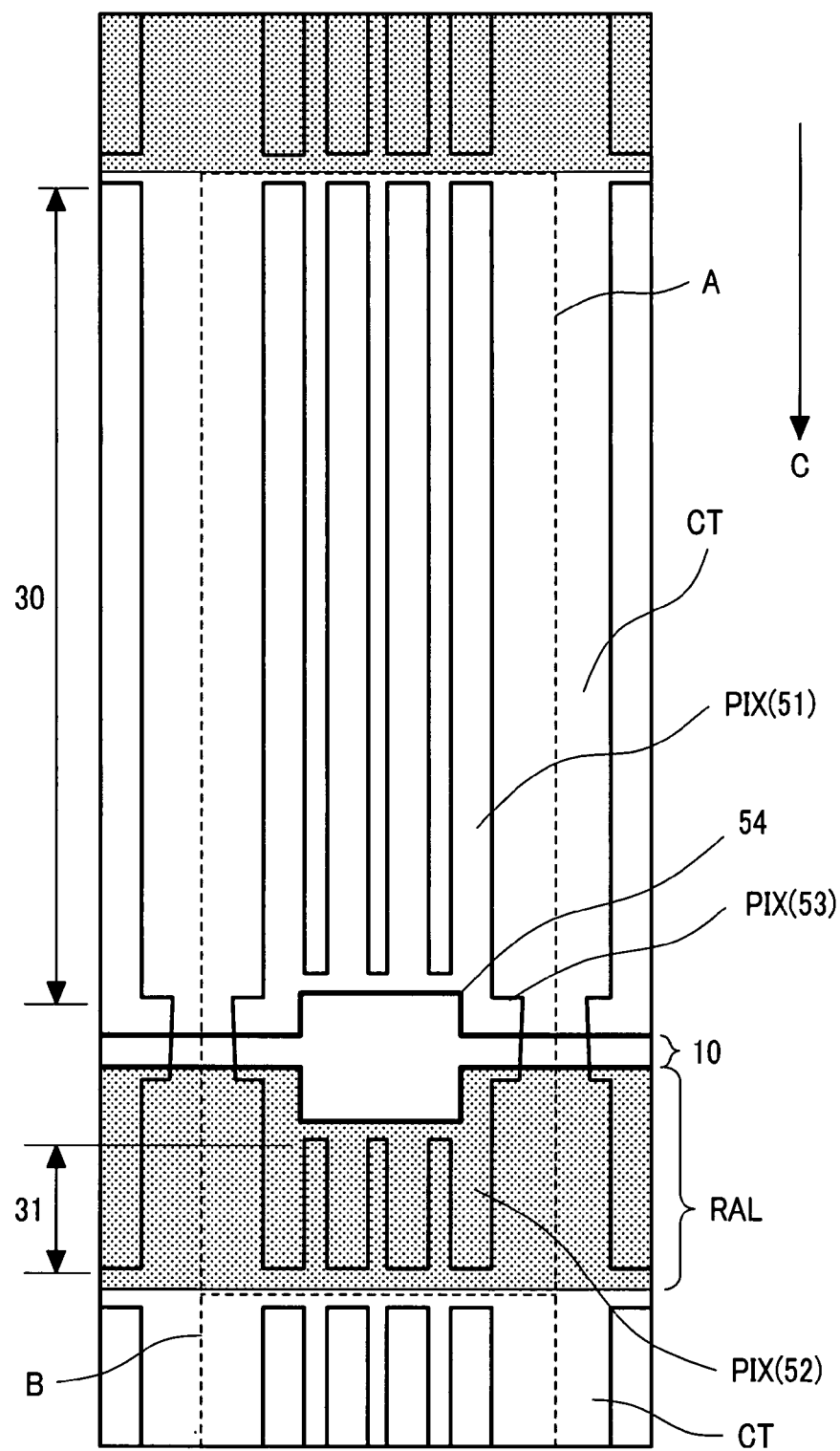
FIG. 1B shows only the pixel electrode, counter electrode and reflective electrode taken out of FIG. 1A.

FIG. 1B shows only the pixel electrode, counter electrode and reflective electrode taken out of FIG. 1A. In FIG. 1B, each of the parts surrounded by dotted-line frames A and B represents one subpixel.

As shown in FIG. 1B, in this first embodiment too, though the pixel electrode (PIX) is common in each subpixel, each of the counter electrode (CT), the transmissive part 30 and the reflective part 31 is independent. Thus, the counter electrode (CT) is bisected into portions one each for the transmissive part and the reflective part. And a reflective electrode (RAL) is formed over the counter electrode (CT) of the reflective part 31.

Incidentally, FIG. 1B shows a configuration in which the counter electrode (CT) of the reflective part 31 on one display line (the display line having the subpixel indicated by A in FIG. 1B) out of two adjoining display lines and the counter electrode (CT) of the transmissive part 30 on the other display line (the display line having the subpixel indicated by B in FIG. 1B) are formed of a common electrode. Arrow C in FIG. 1B indicates the scanning direction.

The pixel electrode (PIX) includes a linking part 53, comb-toothed electrodes (a plurality of linear parts) 51 for the transmissive part, and comb-toothed electrodes (a plurality of linear parts) 52 for the reflective part, formed on the two sides of the linking part 53. A contact hole described later is formed in a region of the linking part 53.

Further, a concave 54 to form a contact hole is disposed in each of the opposing sides of the counter electrode (CT).

Figure 2:
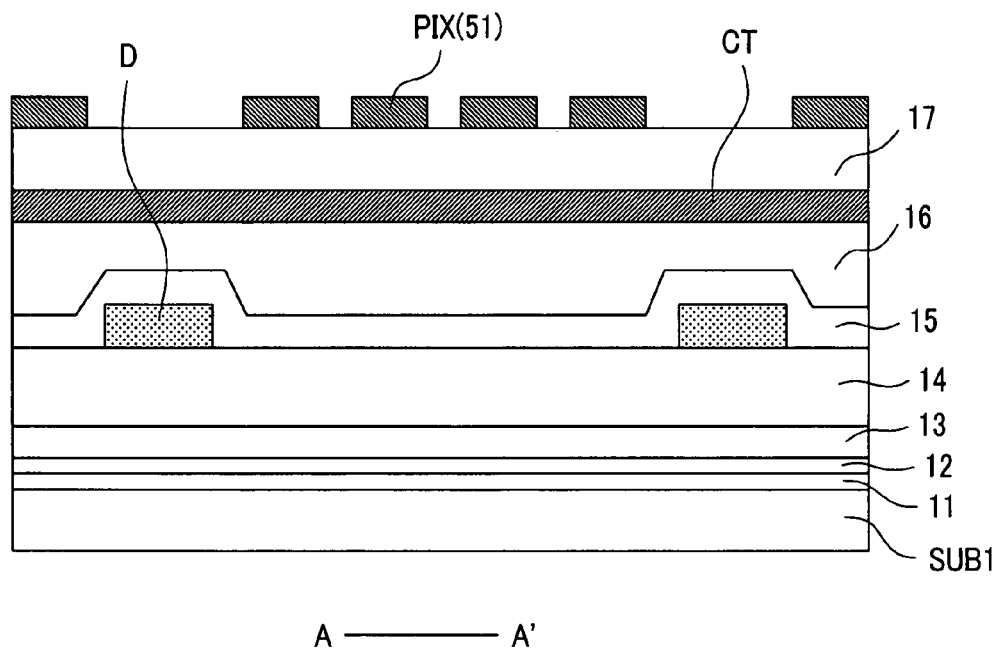
FIG. 2 shows the essential part of a sectional structure along line A-A' in FIG. 1A.

FIG. 2 shows the essential part of a sectional structure along line A-A' in FIG. 1A.

Figure 3:
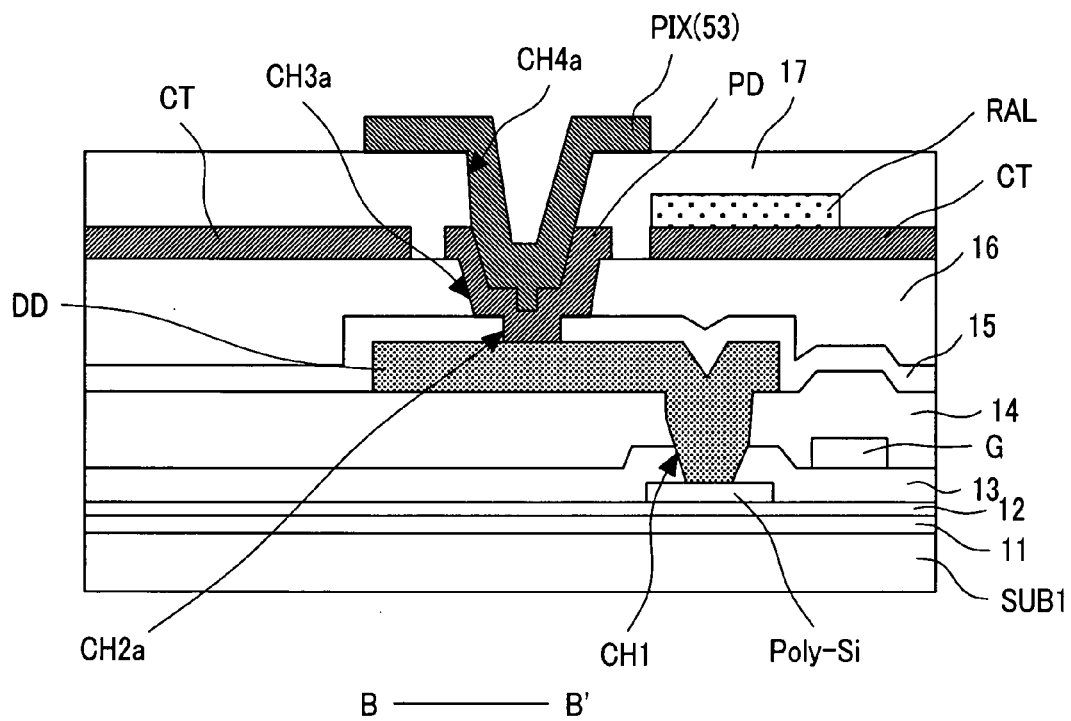
FIG. 3 shows the essential part of a sectional structure along line B-B' in FIG. 1A.

FIG. 3 shows the essential part of a sectional structure along line B-B' in FIG. 1A.

Figure 4:
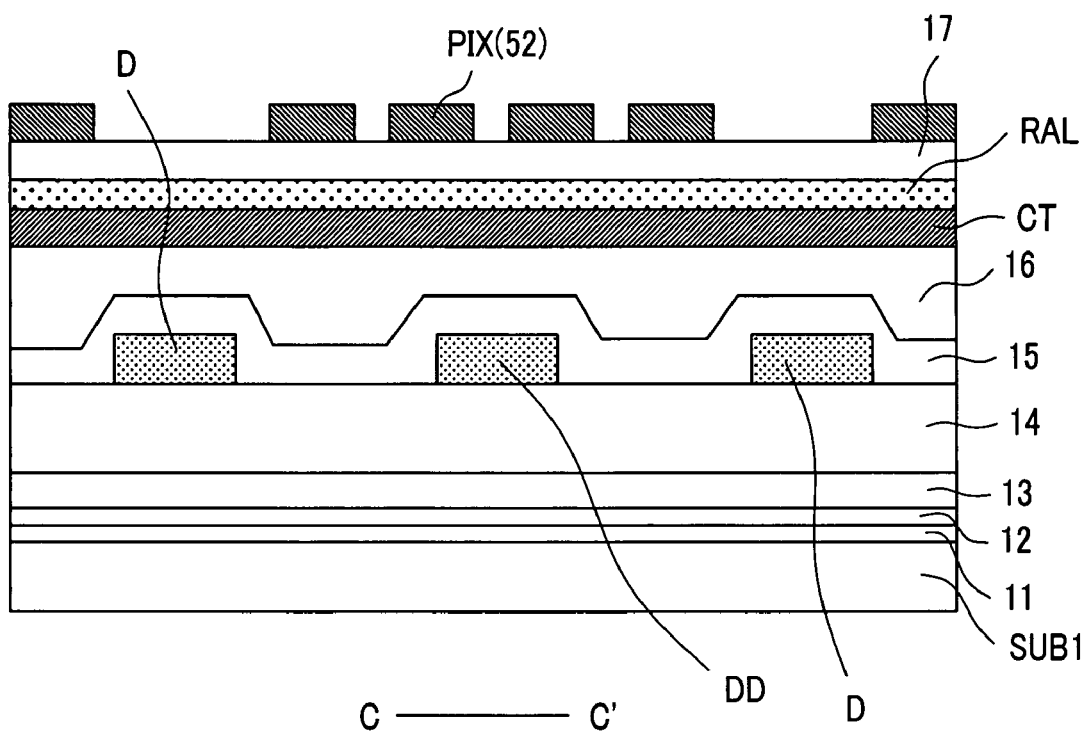
FIG. 4 shows the essential part of a sectional structure along line C-C' in FIG. 1A.

FIG. 4 shows the essential part of a sectional structure along line C-C' in FIG. 1A.

Figure 5:
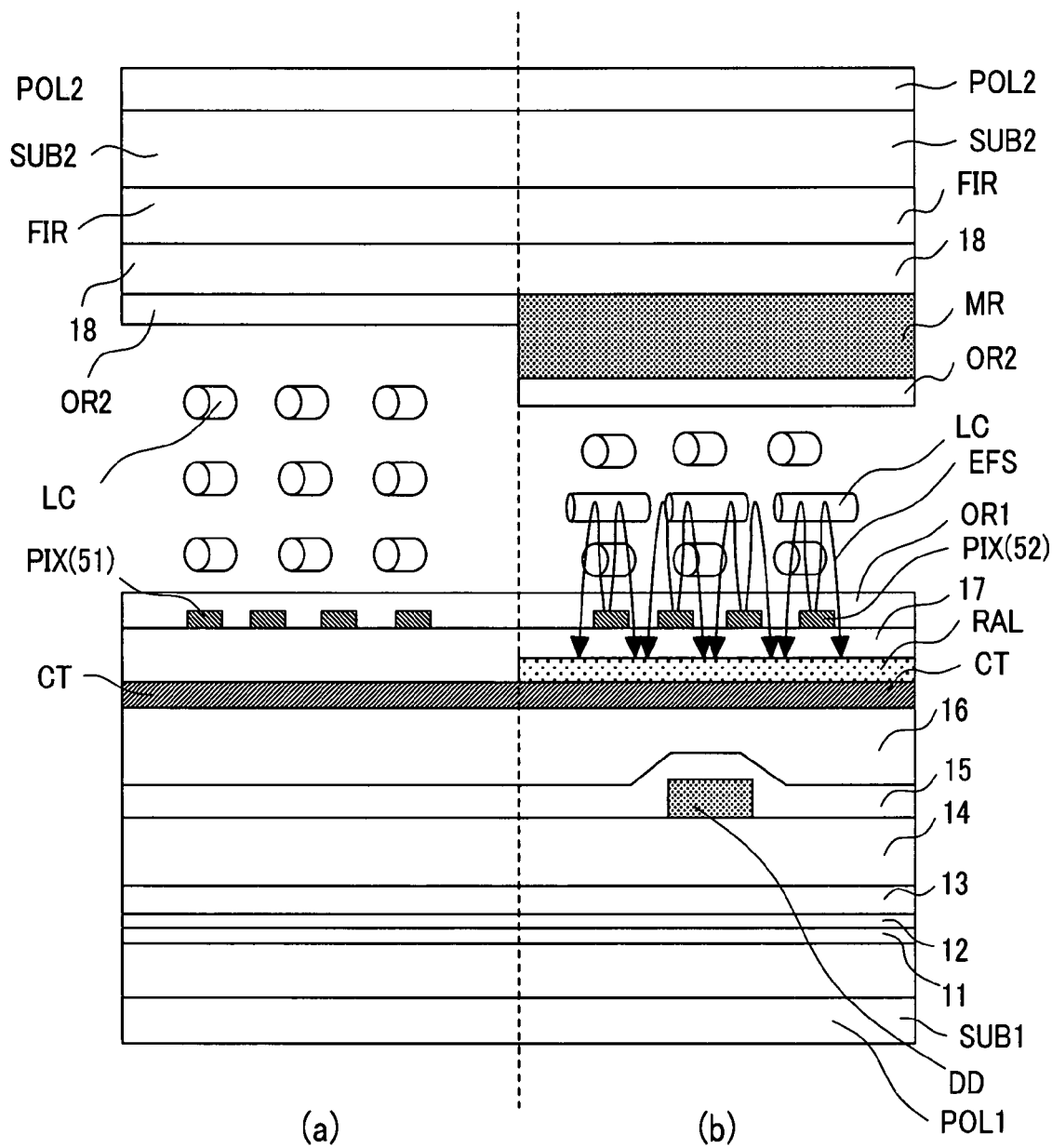
FIG. 5 shows the essential parts of the sectional structures of the transmissive part and the reflective part in the transflective liquid crystal display device of the first embodiment.
Figure 6A:
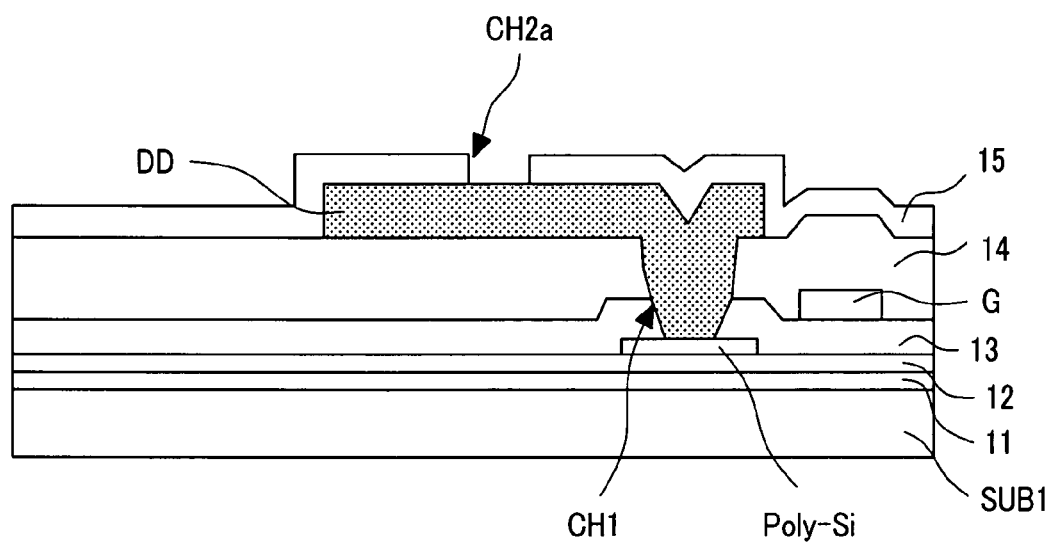
FIG. 6A shows an essential part of the manufacturing process of the transflective liquid crystal display device which is the first embodiment of the invention.
Figure 6B:
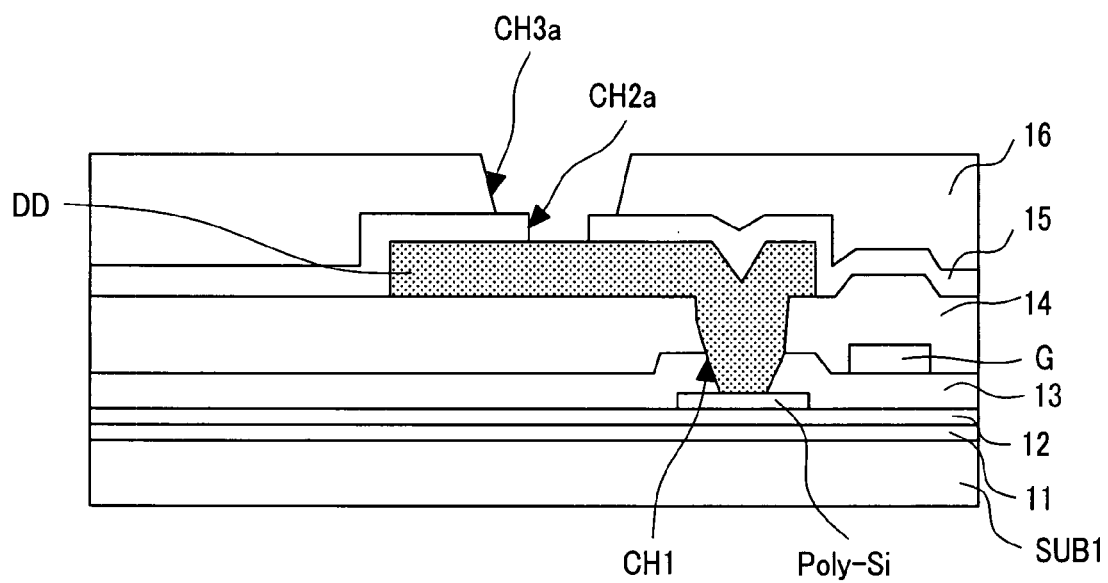
FIG. 6B shows the essential part following FIG. 6A of the manufacturing process of the transflective liquid crystal display device.
Figure 6C:
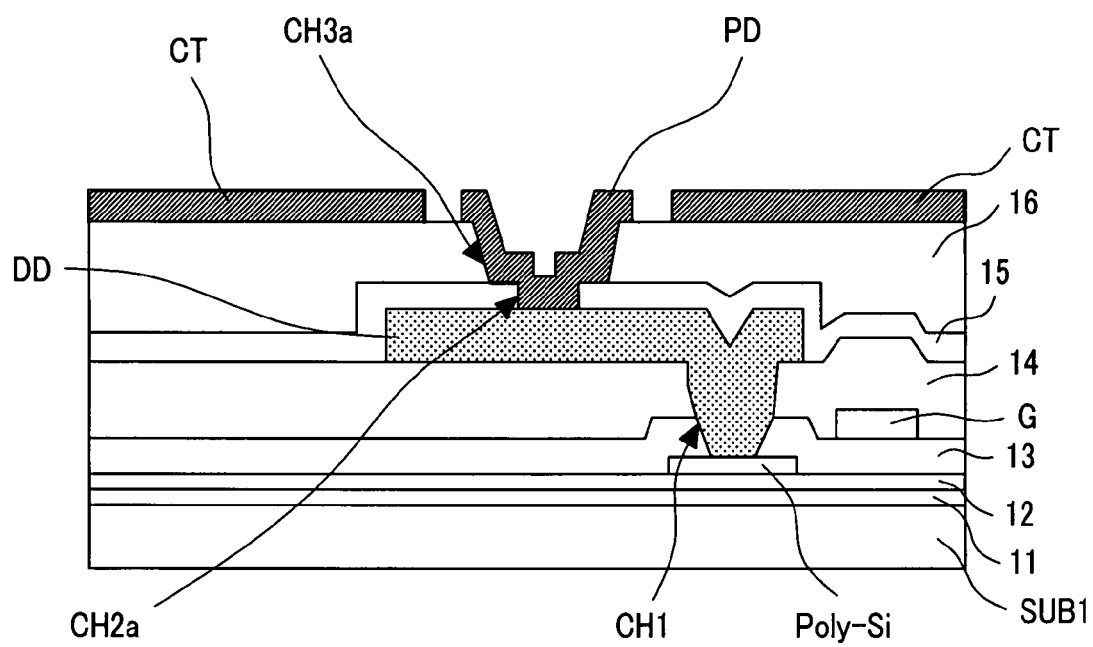
FIG. 6C shows the essential part following FIG. 6B of the manufacturing process of the transflective liquid crystal display device.
Figure 6D:
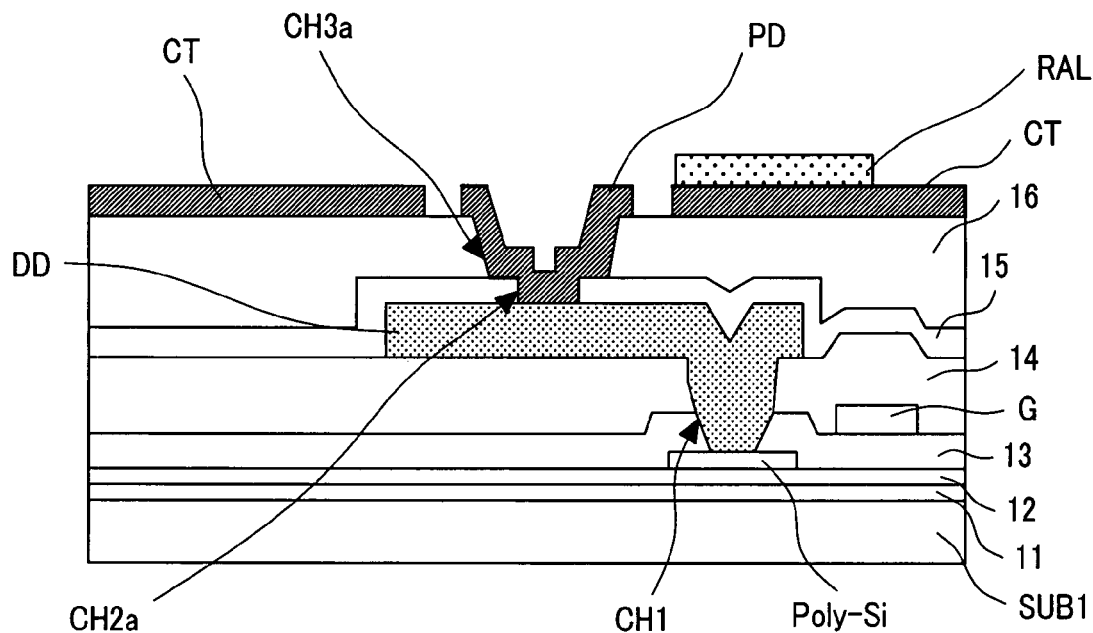
FIG. 6D shows the essential part following FIG. 6C of the manufacturing process of the transflective liquid crystal display device.
Figure 6E:
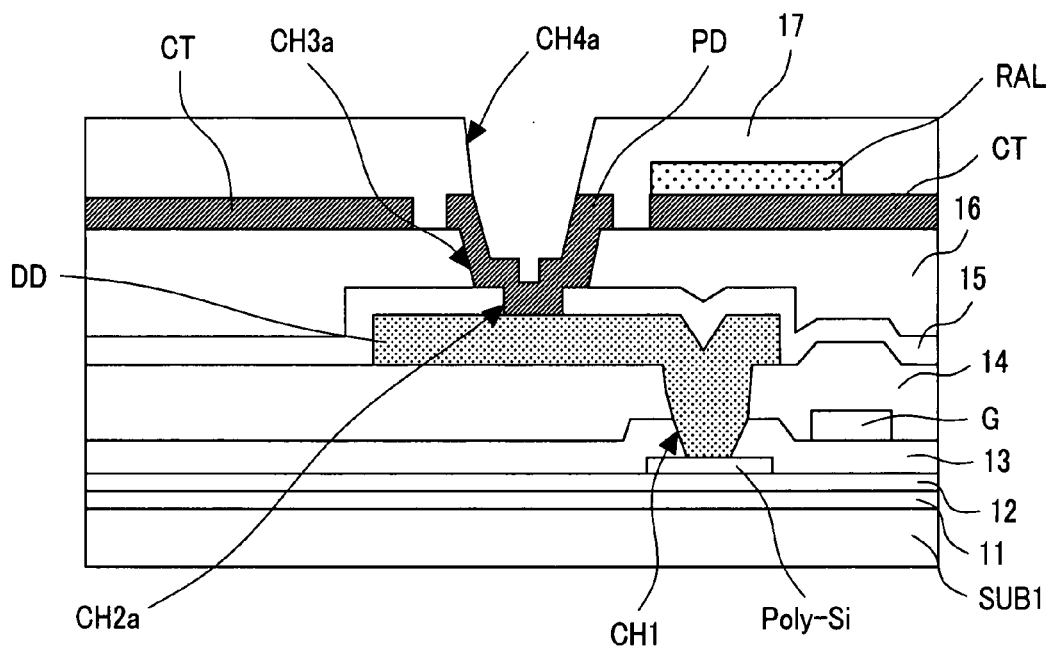
FIG. 6E shows the essential part following FIG. 6D of the manufacturing process of the transflective liquid crystal display device.
Figure 6F:
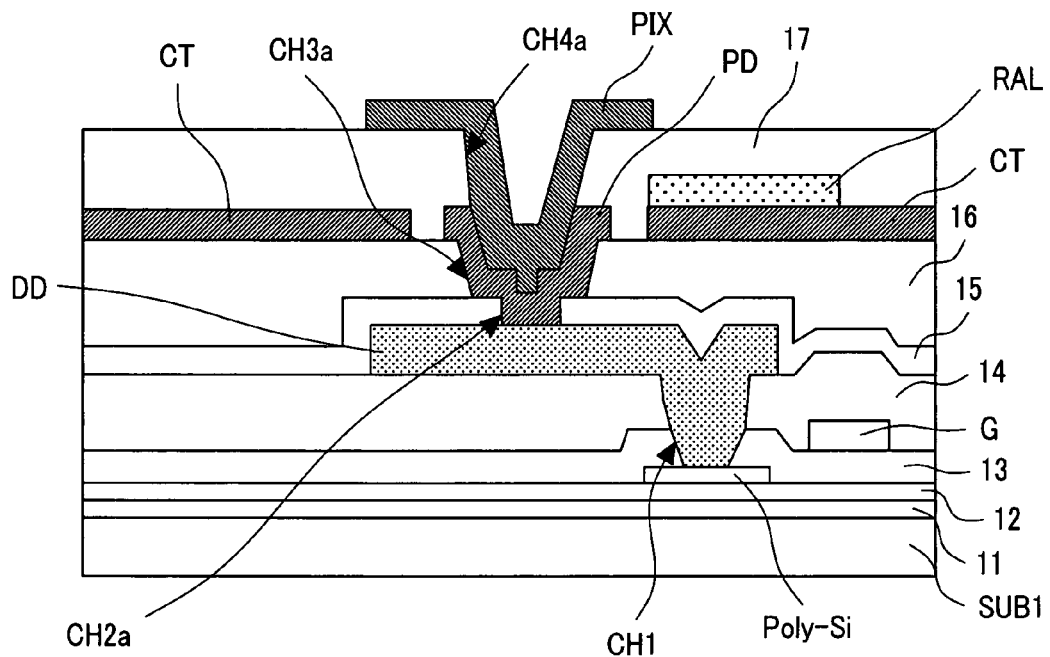
FIG. 6F shows the essential part following FIG. 6E of the manufacturing process of the transflective liquid crystal display device.

FIG. 5 shows the essential parts of the sectional structures of the transmissive part and the reflective part.

In FIG. 5, (a) shows the sectional structure of the transmissive part 30 and (b), the sectional structure of the reflective part 31.

The overall structure of the transflective liquid crystal display device in the first embodiment will be described below with reference to FIG. 2 through FIG. 5.

In this first embodiment, as shown in FIG. 5, a pair of glass substrates (SUB1 and SUB2) are disposed with a liquid crystal layer (LC) containing a large number of liquid crystal molecules sandwiched between them. The main surface side of one of the glass substrates (SUB2) here constitutes the observing side.

On the side of the glass substrate (SUB2) of the transmissive part 30 (FIG. 5(a)), a black matrix (not shown), a color filter (FIR), an insulating film 18 and an orientation film (OR2) are formed in that order from the glass substrate (SUB2) toward the liquid crystal layer (LC).

Incidentally, the configuration on the side of the glass substrate (SUB2) of the reflective part 31 (FIG. 5(b)) is the same as the transmissive part 30 except that a level gap forming layer (MR) is formed between the insulating film 18 and the orientation film (OR2). Here, a polarization plate (POL2) is formed outside the glass substrate (SUB2).

On the side of the glass substrate (SUB1) of the transmissive part 30 (FIG. 5(a)), inter-layer insulating films (11 through 16), the counter electrode (CT), an inter-layer insulating film 17, the pixel electrode (PIX) and an orientation film (OR1) are formed in that order from the glass substrate (SUB1) toward the liquid crystal layer (LC).

Incidentally, the configuration on the side of the glass substrate (SUB1) of the reflective part 31 (FIG. 5(b)) is the same as the transmissive part 30 except that a reflective electrode (RAL) is formed between the counter electrode (CT) and the inter-layer insulating film 17. Here, a polarization plate (POL1) is also formed outside the glass substrate (SUB1).

In FIG. 1A through FIG. 5, reference sign D denotes an image line (also referred to as a source line); G, a scanning line (also referred to as a gate line): Poly-Si, a semiconductor layer; DD, an electrode which functions as the drain electrode of a thin-film transistor (active element); CH1, CH2a, CH3a and CH4a, contact holes; and EFS, an electric line of force.

The pixel electrode (PIX) and the counter electrode (CT) are formed of transparent electroconductive films of, for instance, indium tin oxide (ITO).

The counter electrode (CT) is formed in a planar shape, and further the pixel electrode (PIX) and the counter electrode (CT) overlap each other via the inter-layer insulating film 17 to constitute a holding capacitance.

The level gap forming layer (MR) is intended to so adjust the cell gap length (d) of the liquid crystal layer (LC) of the reflective part 31 as to make the path length of the light in the reflective part 31 correspond to λ/4 of the wavelength. The reflective electrode (RAL) may be formed of a film of metal, such as aluminum (Al), but this is not the only constitution, another available alternative being a two-layered structure consisting of a molybdenum (Mo) lower layer and an aluminum (Al) upper layer.

The electrode (DD) of the thin-film transistor is a three-layered structure comprising, from top to bottom, layers of titanium (Ti), aluminum (Al) and titanium (Ti) for instance.

Where the counter electrode (CT) is split between the transmissive part 30 and the reflective part 31 in each subpixel as in this embodiment, as the voltages applied to the two portions differ, an electric field that cannot be controlled with the pixel electrode (PIX) arises in the gap (or the slit) 10 between the opposing counter electrodes (CT).

This, for instance, gives rise to light leaking portions in the transmissive part 30 near the gap 10 between opposing counter electrode (CT) at the time of black displaying, for instance, with the consequence of reducing the contrast of the transmissive part 30.

To address this problem, the driving of liquid crystals can be made controllable by superposing the pixel electrode (PIX) over the gap 10 between opposing counter electrodes (CT), and then it can be controlled with the pixel electrode (PIX) and the electric field between the opposing counter electrodes (CT) even in the gap 10 between the opposing counter electrodes (CT) thereby to restrain light leaks.

To electrically connect the electrode (DD) of a thin-film transistor positioned underneath the counter electrode (CT) and a pixel electrode (PIX) positioned above the counter electrode (CT), an opening should be bored in the counter electrode (CT) to form a contact hole therein for connection between the electrode (DD) of the thin-film transistor and the pixel electrode (PIX).

By using the gap 10 of the opposing counter electrodes (CT) as the opening in the counter electrode (CT) required for the formation of the contact hole, the area occupied by portions of low liquid crystal driving efficiency can be reduced, resulting in a substantial enhancement of the aperture ratio.

As shown in FIG. 3, the pixel electrode (PIX) is electrically connected to the electrode (DD) of the thin-film transistor via an electroconductor (PD) formed in the contact hole. In this first embodiment, the inter-layer insulating film 15 has a contact hole CH2a, the inter-layer insulating film 16 has a contact hole CH3a and the inter-layer insulating film 17 has a contact hole CH4a. The electroconductor (PD) is electrically connected to the electrode (DD) of the thin-film transistor via the contact holes CH2a and CH3a, and the pixel electrode (PIX) is electrically connected to the electroconductor (PD) via the contact hole CH4a.

The electroconductor (PD) is formed at the same step as and electrically separated from the counter electrode (CT). Further, the electroconductor (PD) is formed inside and outside the contact hole CH3a all over.

The fabrication methods of the parts illustrated in FIG. 2 through FIG. 5 will be described with reference to FIG. 6A through FIG. 6F. Description of the steps before (1) will be dispensed with because they are the same as the normal practice.

(1) Image Line (D), Electrode (DD) of Thin-Film Transistor and Inter-Layer Insulating Film 15 (see FIG. 6A):

In order to form the image line (D) and the electrode (DD) of the thin-film transistor, materials for the lower Ti layer, the intermediate Al layer and the upper Ti layer are prepared, and patterned into the image line (D) and the electrode (DD) of the thin-film transistor. After that, an SiN film is formed to a thickness of 200 nm by CVD.

(2) Contact Hole (CH2a) (see FIG. 6A):

After the inter-layer insulating film 15 is formed, it is coated with a photosensitive resist, a photomask on which a desired pattern is formed is used for masking in exposure to light to partly remove the resist with an alkali developer (if a positive resist is used, the light-exposed part is removed).

Masked with the pattern of the resist, the inter-layer insulating film 15 is partly removed by dry etching with $SF_{6+}O_2$ or $CF_2$ gas.

To take note of the pixel part, in order to connect the electrode (DD) of the thin-film transistor and the pixel electrode (PIX) to be formed by the following process, a contact hole (CH2a) is bored in the electrode (DD) part.

After the contact hole CH2a is bored, in order to terminate with hydrogen the defect of Poly-Si arranged underneath the electrode (DD) of the thin-film transistor, annealing is carried out for one hour in an $H_2$ atmosphere at 400° C.

(3) Inter-Layer Insulating Film 16 and contact Hole (CH3a) (see FIG. 6B):

After the formation of the contact hole CH2a, a photosensitive resin is applied and, masked with a photomask on which a desired pattern is formed, the resist is partly removed with an alkali developer. In this process, the resist in the part corresponding to the contact hole (CH3a) is removed.

The unevenness of the substrate surface can be controlled by adjusting the baking conditions of the resin, which are 230° C. in temperature and 60 minutes in duration for this first embodiment to make the substrate surface substantially flat except the contact hole portion.

Further, the thickness of the inter-layer insulating film 16 is about 1.8 μm (in the flat part (except the contact hole portion) of the pixel electrode) after baking.

Incidentally, the reflective part may be made uneven by using halftone light exposure or otherwise. This would shape the RAL surface more rugged to make possible diffusive reflection.

(4) Counter Electrode (CT) and Electroconductor (PD) (see FIG. 6C):

After forming an amorphous ITO (77 nm) by sputtering, it is coated with a photosensitive resist.

A photomask on which a desired pattern is formed is used for masking in exposure to light to partly remove the resist with an alkali developer (if a positive resist is used, the light-exposed part is removed). Masked with the pattern of the resist, the ITO is removed with an ITO-effective etchant (e.g. oxalic acid). In this first embodiment, the pattern is so devised as to leave the electroconductor (PD) where the contact hole for connecting the electrode (DD) of the thin-film transistor and the pixel electrode (PIX) is positioned.

After that, the resist is removed with a resist stripper (e.g. mono-ethanol amine (MEA)). Finally, heat treatment at 230° C. is carried out for 60 minutes to prevent the amorphous ITO from being dissolved by the acid liquid to be used in working on the reflective electrode (RAL comprising an upper AlSi layer and a lower MoW layer) to be formed at the next step, and the amorphous ITO is crystallized.

In panel driving, as the aforementioned electroconductor (PD) differs in potential from the counter electrode (CT) nearby, there is secured at least a minimum required space between them (the spacing between the counter electrodes (CT) and the electroconductor (PD): 1 μm or more).

(5) Reflective Electrode (RAL) (see FIG. 6D):

After forming the Mo (50 nm) and Al (150 nm) layers in that order by sputtering, a photosensitive resist is applied. A photomask on which a desired pattern is formed is used for masking in exposure to light to partly remove the resist with an alkali developer (if a positive resist is used, the light-exposed part is removed). Masked with the pattern of the resist, the ITO is removed with an etchant which can work on Mo and Al at the same time (e.g. a mixture of phosphoric acid and nitric acid).

After that, the resist is removed with a resist stripper (e.g. mono-ethanol amine (MEA)).

(6) Inter-Layer Insulating Film 17 and Contact Hole (CH4a) (see FIG. 6E):

This film is formed by the same method as the inter-layer insulating film 16 is. In this particular first embodiment, an opening is bored in the inter-layer insulating film 17 over the electroconductor (PD) to form the contact hole (CH4a).

Incidentally, even where the surface of the reflective electrode (RAL) is made rugged to achieve diffusive reflection, the surface of the inter-layer insulating film 17 can be made flat because a coating type insulating film is used.

(7) Pixel electrode (PIX) (see FIG. 6F):

After forming the ITO (77 nm) by sputtering, a photosensitive resist is applied, and a photomask on which a desired pattern is formed is used for masking in exposure to light to partly remove the resist with an alkali developer (if a positive resist is used, the light-exposed part is removed). Masked with the pattern of the resist, the ITO is removed with an ITO-effective etchant (e.g. oxalic acid). After that, the resist is removed with a resist stripper (e.g. mono-ethanol amine (MEA)). The pixel electrode (PIX) is formed over the counter electrode (CT) in a comb-toothed pattern.

Figure 7:
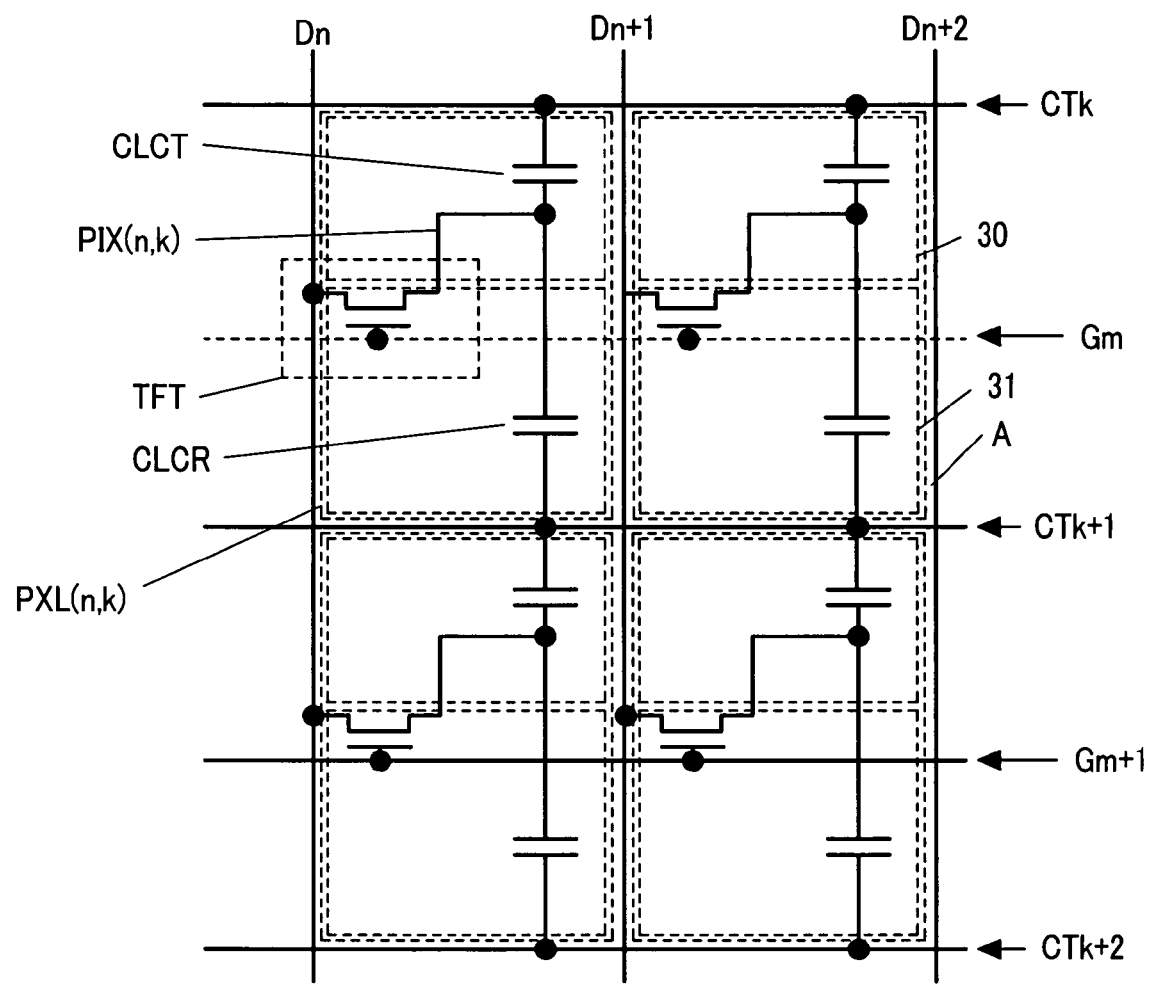
FIG. 7 shows an equivalent circuit to the pixel part of liquid crystal display panel of the transflective liquid crystal display device which is the first embodiment of the invention.

FIG. 7 shows an equivalent circuit to the liquid crystal display panel of the transflective liquid crystal display device of this first embodiment.

In FIG. 7, Dn, Dn+1 and Dn+2 respectively denote the n-th, (n+1)-th and (n+2)-th image lines; Gm and Gm+1, respectively the m-th and (m+1)-th scanning lines; CTk, CTk+1 and CTk+2, respectively the k-th, (k+1)-th and (k+2)-th counter electrodes; A, one subpixel; CLCT, the liquid crystal capacity of the transmissive part 30; and CLCR, the liquid crystal capacity of the reflective part 31.

The direction in which the image lines (D) extend and that in which the scanning lines (G) and the counter electrodes (CT) extend cross each other either orthogonally or otherwise. The counter electrodes (CT) are arranged in a stripe shape.

The source electrodes of the thin-film transistors (TFT) are connected to the image lines (D) and the drain electrodes (electrodes (DD)), to the pixel electrodes (PIX), to which the voltage of the image lines (D) is supplied via the thin-film transistors (TFT).

The gate electrodes of the thin-film transistors (TFT) are connected to the scanning lines (G), which turn on and off the thin-film transistors (TFT).

In this embodiment, while the transmissive part 30 and the reflective part 31 share the same pixel electrode (PIX) in each subpixel, their counter electrodes (CT) differ, whose potentials also differ.

The rise of the scanning line (Gm) to the high level causes the thin-film transistors (TFT) to be turned on, and image potentials are written into the pixel electrodes (PIX(n, k)).

Even after the fall of the scanning line (Gm) to the low level, the voltage written in when it was at the high level is held by the holding capacitance disposed within the subpixel (PXL) until the scanning line (Gm) rises to the high level in the next frame. As stated above, the holding capacitance is composed of the counter electrode (CT) formed in a planar shape, the pixel electrode (PIX) and the inter-layer insulating film 17 formed between the counter electrode (CT) and the pixel electrode (PIX).

The voltage levels of the counter electrode (CTk) and of the counter electrode (CTk+1) differ from each other; for instance, when the counter electrode (CTk) is at the H-level, the counter electrode (CTk+1) is at the L-level (except immediately before the scanning line (Gm) rises to the H-level).

The liquid crystal layer (LC) of the transmissive part 30 is driven by the potential difference between the counter electrode (CTk) and the pixel electrodes (PIX(n, k)), and that of the reflective part 31, by the counter electrode (CTk+1) and the pixel electrodes (PIX(n, k)).

In this first embodiment, the voltages to be applied to the respective liquid crystal molecules of the transmissive part 30 and the reflective part 31 are controlled in this way.

The presence of a parasitic capacitance (Cds) formed between the image line (D) and the drain electrode of the thin-film transistor (TFT) constitutes the cause of unevenness of display which is directly consequent on the interlocking of the pixel electrode potential with variations in the potential of the image line (D) when the thin-film transistor (TFT) is off. When the parasitic capacitance (Cds) fluctuates from sub-pixel to subpixel, unevenness of display emerges conspicuously. The foregoing description presupposes that a small enough designed parasitic capacitance (Cds) would eliminate variations in the pixel electrode potential.

Figure 8:
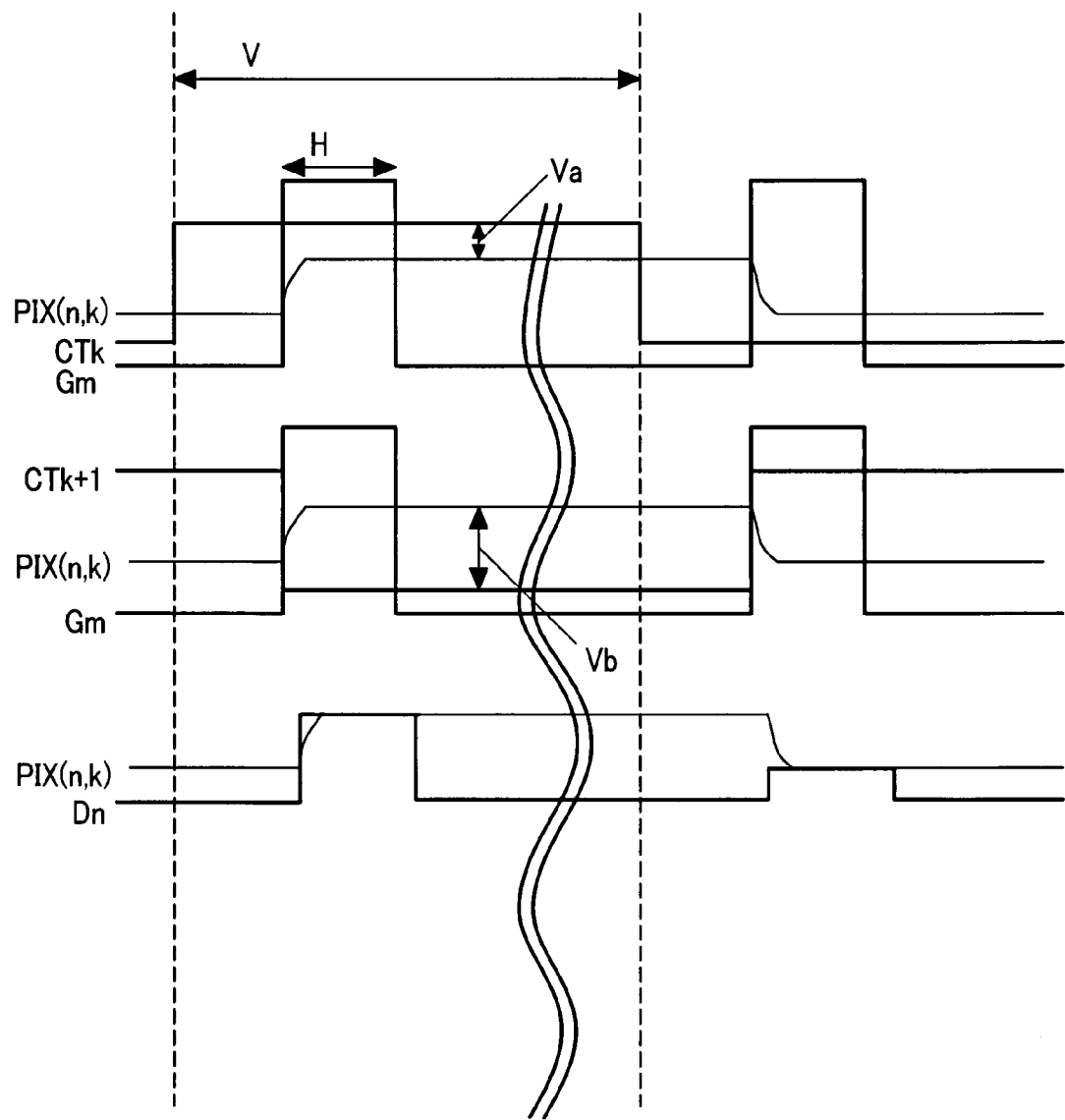
FIG. 8 illustrates the voltage waveforms of the subpixel ((PXL) (n, k)) as shown in FIG. 7.

The voltage waveform of the subpixel ((PXL(n, k)) shown in FIG. 7 is diagrammed in FIG. 8. In FIG. 8, Va denotes the potential difference between the pixel electrode (PIX) and the counter electrode (CT) of the transmissive part 30 and Vb, the potential difference between the pixel electrode (PIX) and the counter electrode (CT) of the reflective part 31. Further, H denotes one horizontal scanning period; V, one vertical scanning period (frame period); Gm, a scanning signal; Dn, an image signal; and PIX(n, k), the voltage of the pixel electrode.

Here in the fabrication process of this first embodiment, since the electrode (DD) of the thin-film transistor is covered by the electroconductor (PD) composed of the same material as the counter electrode (CT) when the reflective electrode (RAL) is worked upon, it is not dissolved during the patterning of the reflective electrode (RAL).

Ti, which essentially is in the top layer of the electrode (DD) of the thin-film transistor is not dissolved in the mixture of phosphoric acid and nitric acid used in working on the reflective electrode (RAL). Therefore, the electroconductor (PD) may appear unnecessary. However, in some process after the electrode (DD) of the thin-film transistor is formed, Al of the base may become diffused in Ti, with 1% or more of Al reaching the Ti surface. Therefore, where the electroconductor (PD) is absent and the electrode (DD) of the thin-film transistor is exposed, the electrode (DD) may be damaged or Ti lifted off along with the dissolution of Al present on the electrode (DD) surface when the reflective electrode (RAL) is etched.

More specifically, at the step of forming the substrate (SUB1), to terminate the defect of Poly-Si after the formation of the inter-layer insulating film 15, annealing is performed at 400° C. in an $H_2$ ambience; then Ti absorbs H and becomes brittle. As a consequence, the Al base of the electrode (DD) is readily diffused within the top Ti layer of the electrode (DD) and reaches the surface, and if the Al concentration on the surface is 1% or above and the electrode (DD) of the thin-film transistor is exposed at the time of etching the reflective electrode (RAL), the electrode (DD) will be dissolved.

For the reason stated above, the presence or absence of Al or Mo which is the main material constituting the reflective electrode (RAL) on the surface of the electrode (DD) of the thin-film transistor constitutes the criterion according to which it is decided whether or not the electroconductor (PD) is needed in the contact hole for connecting the electrode (DD) of the thin-film transistor and the pixel electrode (PIX). Especially where its concentration is 1% or above, which makes Ti more soluble, it is desirable to provide the electroconductor (PD).

Electrically connecting in this way the electrode (DD) of the thin-film transistor and the pixel electrode (PIX) via the electroconductor (PD) in which the contact hole is bored results in covering, when the reflective electrode (RAL) is worked upon, of the electrode (DD) of the thin-film transistor with the electroconductor (PD) formed of the same material as the counter electrode (CT), and accordingly the electrode (DD) of the thin-film transistor is not dissolved during the patterning of the reflective electrode (RAL). As a result, faulty connection between the electrode (DD) of the thin-film transistor and the pixel electrode (PIX) can be restrained, making it possible to enhance the manufacturing yield of transflective liquid crystal display devices.

Incidentally, direct connection of Al and the ITO would cause an insulating aluminum oxide, consisting of Al and oxygen in the ITO, to be formed on their interface to make the connection resistance unstable (reduce the reliability of connection). Therefore, the electrode (DD) of the thin-film transistor and the electroconductor (PD) are connected by Ti and the ITO. For the same reason, it is undesirable to form the electroconductor (PD) of aluminum, because it would destabilize the connection between the pixel electrode (PIX) and the ITO.

In the peripheral circuit part, controlling the potential to be supplied to the counter electrode (CT) with the thin-film transistors (TFT2) requires connection (by a contact hole) of the counter electrode (CT) and the electrode (DD1) of the thin-film transistor (TFT2).

Figure 9:
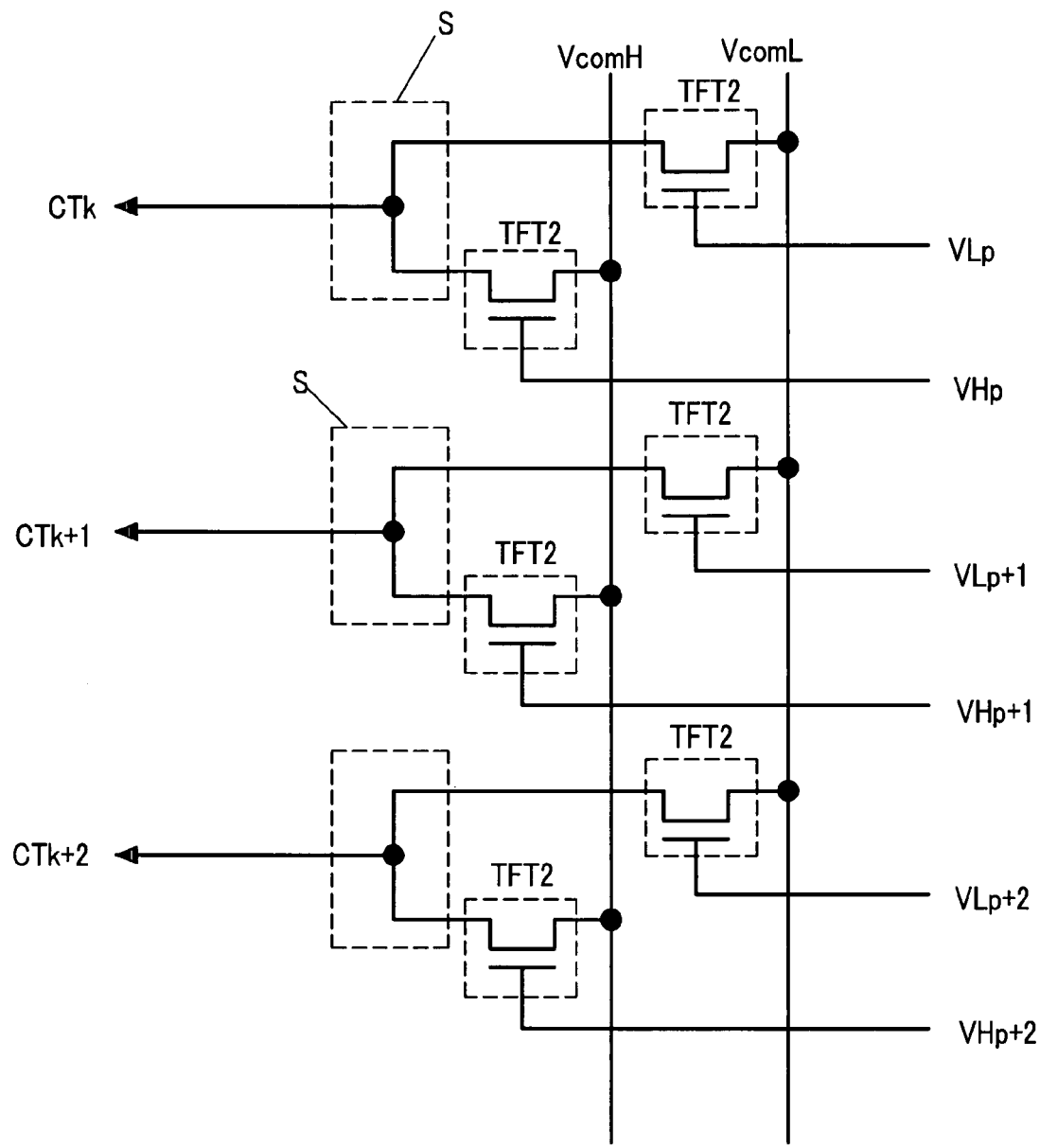
FIG. 9 shows an equivalent circuit to the peripheral circuit part of the liquid crystal display panel in the transflective liquid crystal display device of the first embodiment.
Figure 10:
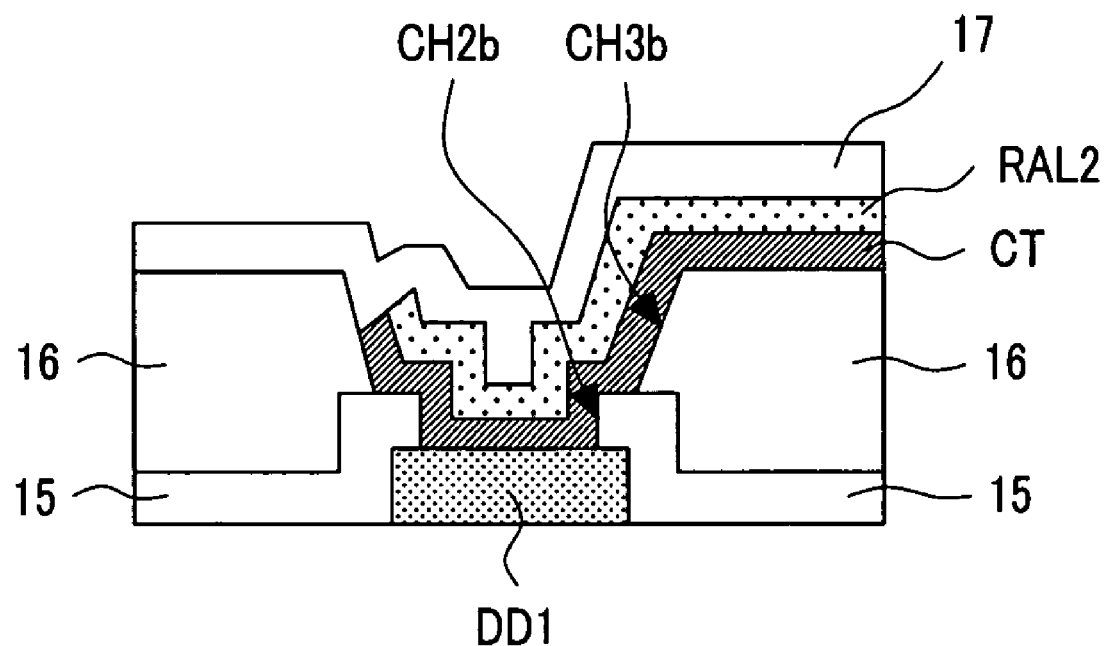
FIG. 10 shows the essential part of the sectional structure of the connecting part surrounded by broken lines in FIG. 9.

FIG. 9 shows an equivalent circuit to the peripheral circuit part of the liquid crystal display panel in the transflective liquid crystal display device of this first embodiment, and FIG. 10, the essential part of the sectional structure of the connecting part surrounded by broken lines in FIG. 9.

Referring to FIG. 9, fixed potentials VcomH and VcomL, which are inputted from outside, respectively denote the high level potential and the low level potential of the two-valued counter electrode (CT). The potentials supplied to the counter electrode (CT) are controlled by the thin-film transistor (TFT2) which is turned or off by a voltage VH or VL. Both VH and VL are supplied from outside.

In the peripheral circuit part, as shown in FIG. 10, the connection between the electrode (DD1) of the thin-film transistor and the counter electrode (CT) is accomplished via a contact hole (CH2b) bored in the inter-layer insulating film 15 and a contact hole (CH3b) bored in the inter-layer insulating film 16. The contact hole (CH2b) is bored at the same step as the boring of the contact hole (CH2a) in the pixel part, and the contact hole (CH3b), at the same step as the boring of the contact hole (CH3a) in the pixel part.

Figure 24:
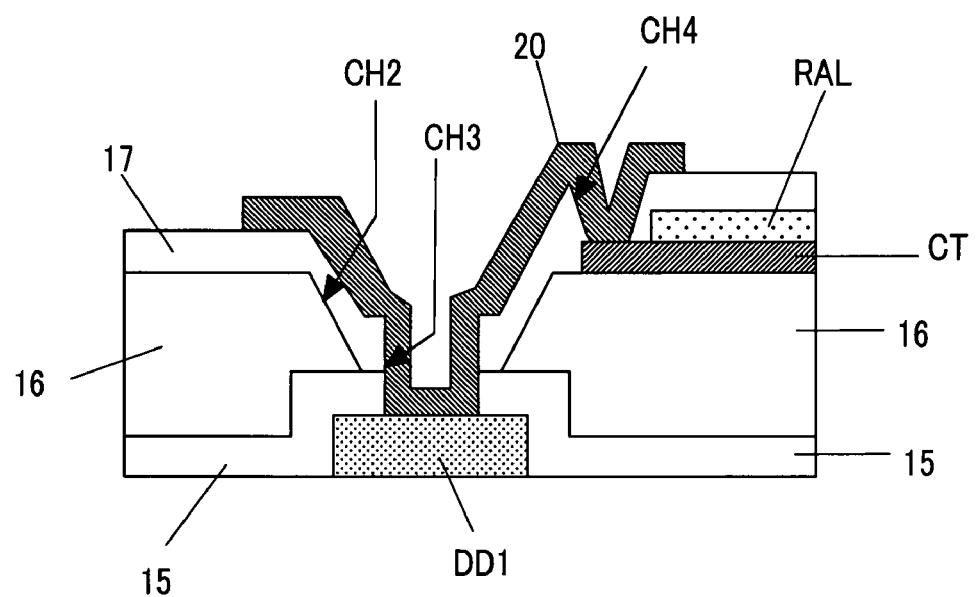
FIG. 24 shows the essential part of the sectional structure of the connecting part which electrically connects the electrode of a thin-film transistor to a counter electrode in a peripheral circuit of the liquid crystal panel in the transflective liquid crystal display device whose application to the structure of Japanese Patent Application No. 2006-109659 is under consideration.

As described above, application of the fabrication process of this first embodiment can help enhance the manufacturing yield and, moreover, can restrain a rise in connection resistance because, as shown in FIG. 24, there is no need for the use of a high resistance ITO film for the connection of the counter electrode and the electrode of the thin-film transistor. As a result, the display quality of the transflective liquid crystal display device can be improved because unevenness of display due to fluctuations in driving voltage applied to the counter electrode (CT) can be restrained.

Also, an increase in the area required for connection (namely, an expansion of the non-display area) can be restrained.

Incidentally, though a metal film (RAL2) formed at the same step as the reflective electrode (RAL) as shown in FIG.

10 to reduce the wiring resistance is electrically connected to the counter electrode (CT) inside and outside the contact hole (CH3b) all over, the metal film (RAL2) need not be connected to the counter electrode (CT) within the contact hole (CH3b).

Embodiment 2

Figure 13:
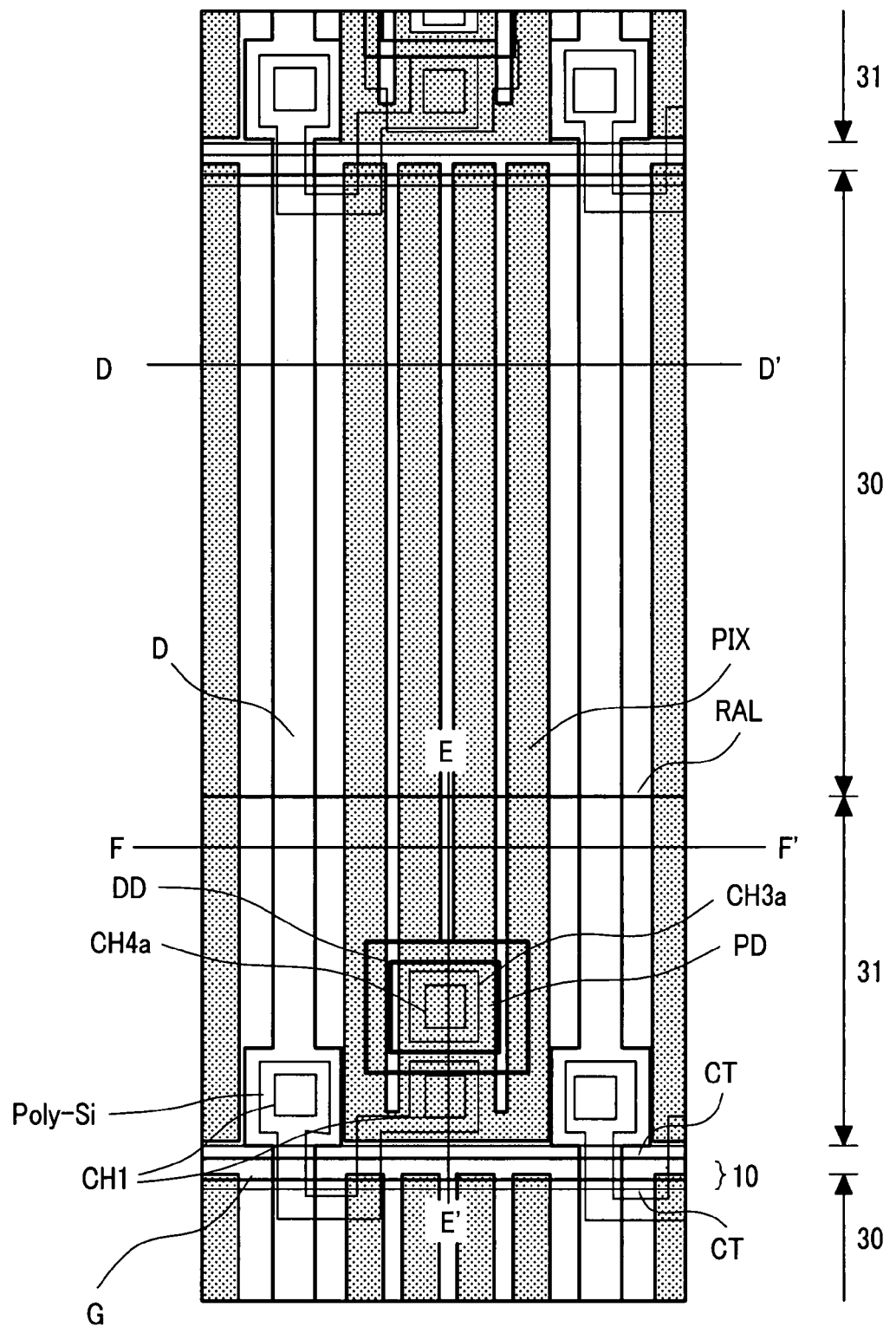
FIG. 13 shows a plan of the electrode structure of the subpixel of the transflective liquid crystal display device, which is a second embodiment of the invention.
Figure 14:
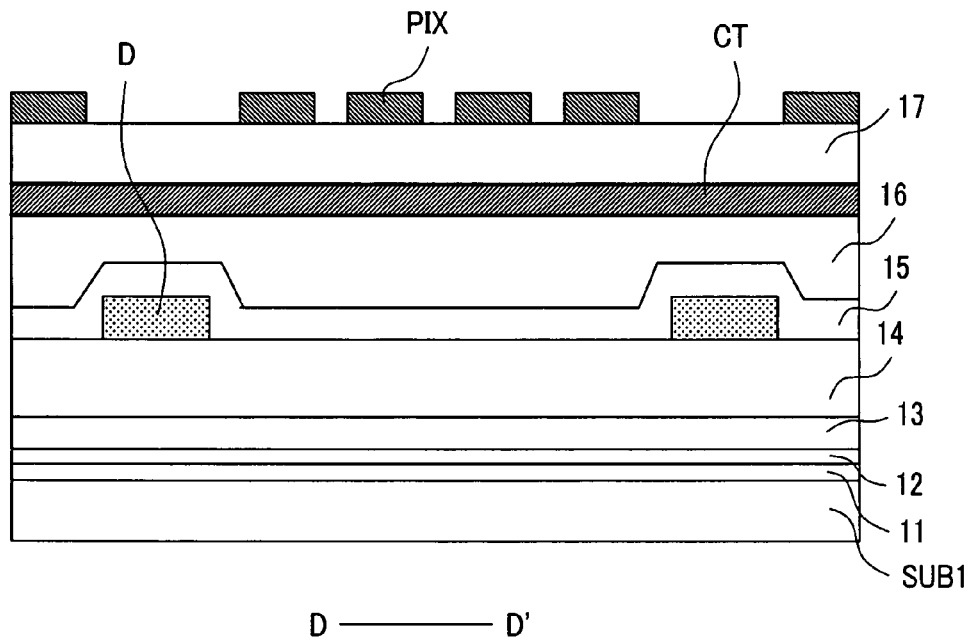
FIG. 14 shows the essential part of a sectional structure along line D-D' in FIG. 13.
Figure 15:
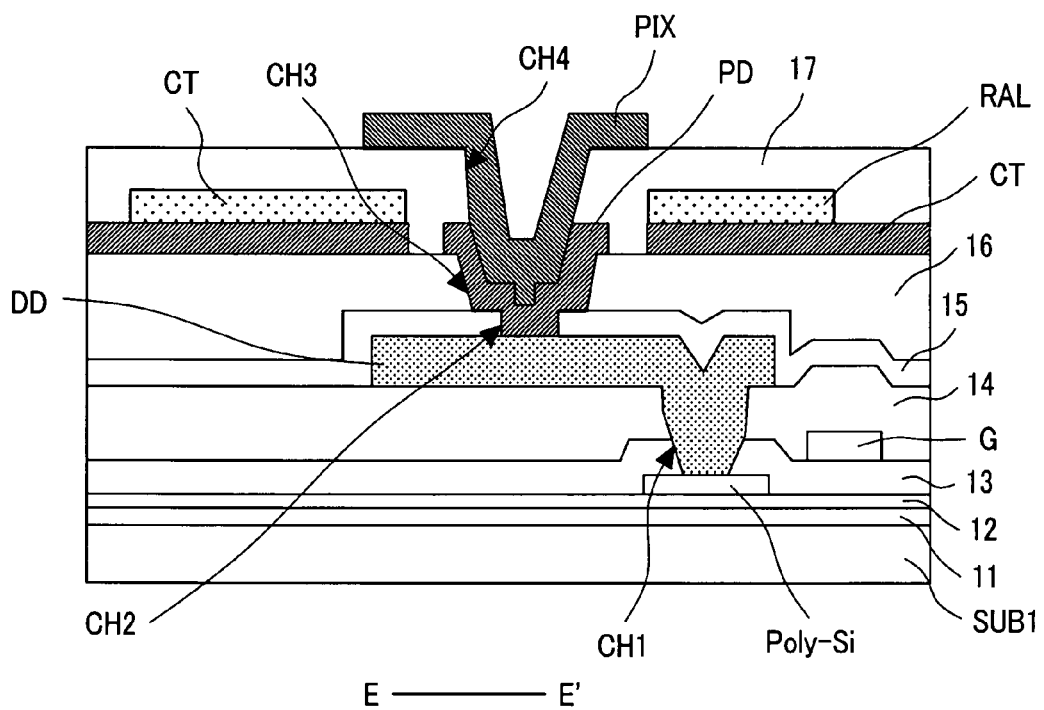
FIG. 15 shows the essential part of a sectional structure along line E-E' in FIG. 13.
Figure 16:
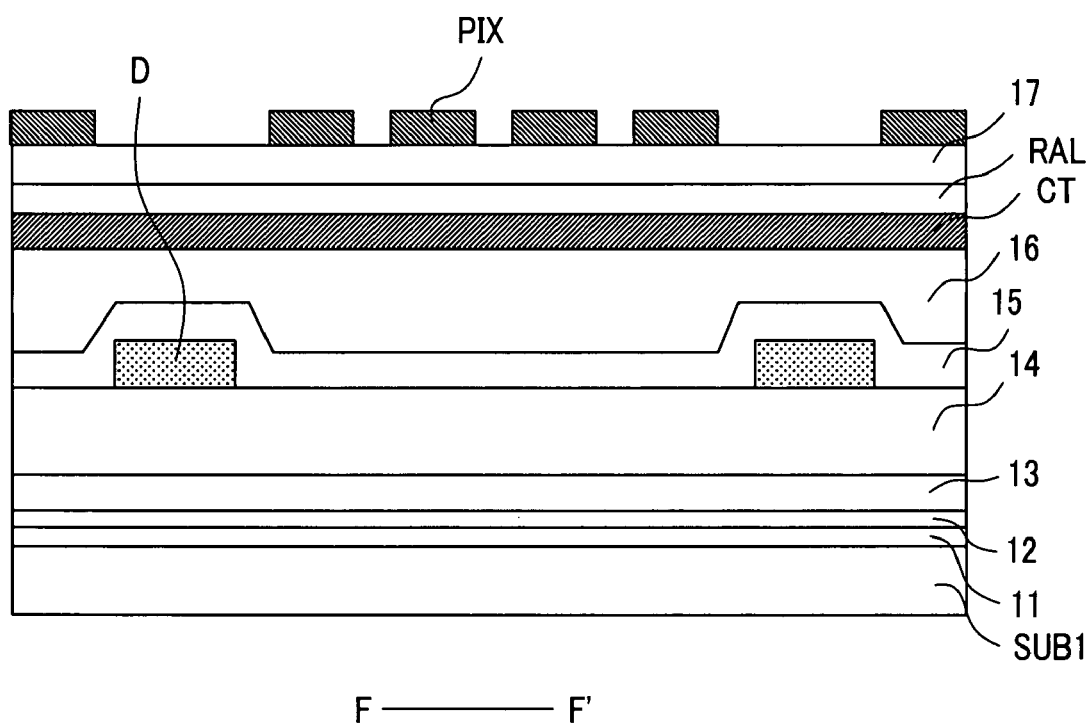
FIG. 16 shows the essential part of a sectional structure along line F-F' in FIG. 13.

FIG. 13 through FIG. 17 pertain to a transflective liquid crystal display device, which is a second embodiment of the invention, wherein FIG. 13 shows a plan of the electrode structure of the subpixel of the transflective liquid, crystal display device; FIG. 14, the essential part of a sectional structure along line D-D' in FIG. 13; FIG. 15, the essential part of a sectional structure along line E-E' in FIG. 13; FIG. 16, the essential part of a sectional structure along line F-F' in FIG. 13; and FIG. 17, the essential parts of the sectional structures of the transmissive part and the reflective part of the subpixel in the transflective liquid crystal display device.

Figure 17:
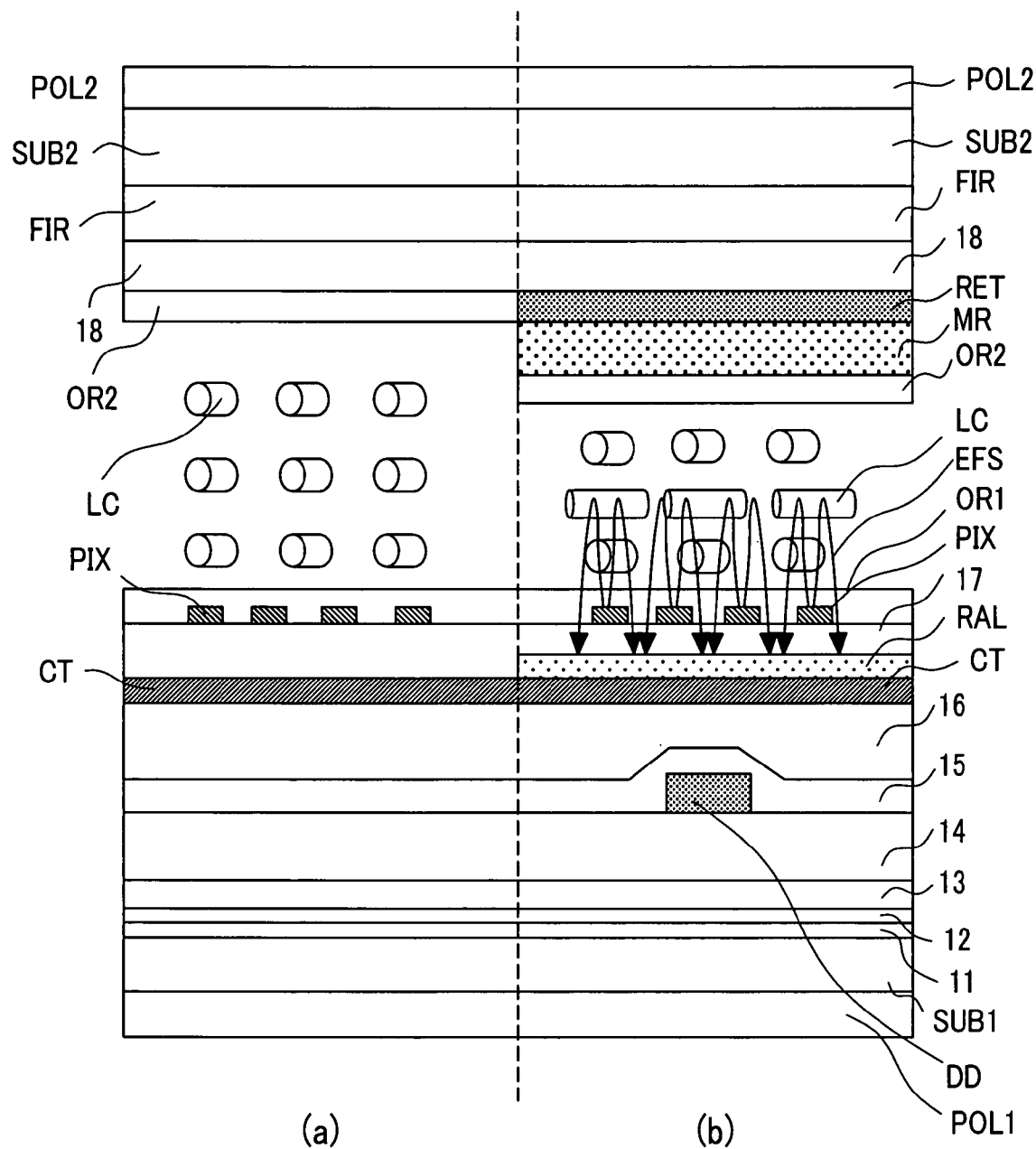
FIG. 17 shows the essential parts of the sectional structures of the transmissive part and the reflective part of the subpixel in the transflective liquid crystal display device of the second embodiment of the invention.

In FIG. 17, (a) shows the sectional structure of the transmissive part 30 and (b), the sectional structure of the reflective part 31.

In the pixel structure of each subpixel of the transflective liquid crystal display device of this embodiment, the pixel electrode and the counter electrode are shared between the transmissive part and the reflective part. Thus in this embodiment, the counter electrode is independent in neither the transmissive part nor the reflective part; nor is applied a different reference voltage to each.

For this reason, in the transflective liquid crystal display device of this embodiment, when for instance the transmissive part is normally black, the reflective part is normally white; namely relative brightness is reversed between the transmissive part and the reflective part.

Therefore, in the transflective liquid crystal display device of this embodiment, a phase differential plate (½ wavelength plate) (RET) is inserted into the reflective part to prevent relative brightness from being reversed between the transmissive part and the reflective part.

For this reason, though this embodiment has basically the same configuration as first embodiment described above as shown in FIG. 13 through FIG. 17, it is different in the following respects.

Thus, the transflective liquid crystal display device of this second embodiment has a counter electrode (CT) formed in each subpixel as shown in FIG. 13, and the reflective part 31 has the phase differential plate (RET) as shown in FIG. 17. In this second embodiment, the phase differential plate (RET) is disposed on the liquid crystal layer side of the glass substrate (SUB2).

This second embodiment configured as stated above, too, can contribute to enhancing the manufacturing yield and improving the display quality of transflective liquid crystal display devices as does the foregoing first embodiment.

Where the reference potential is to be differentiated from the counter electrode (CT) on the adjacent row, the structure of FIG. 10 can be applied to the peripheral circuit as in first embodiment.

To add, the present invention is applicable to a transflective liquid crystal display device of which either the transmissive part or the reflective part is or both are provided with a phase differential plate (RET).

The phase differential plate (RET) may be provided on the glass substrate (SUB1) side. Or, the phase differential plate (RET) may be disposed on the side of the glass substrate (SUB1) or (SUB2) reverse to the liquid crystal layer (LC).

Embodiment 3

Figure 22:
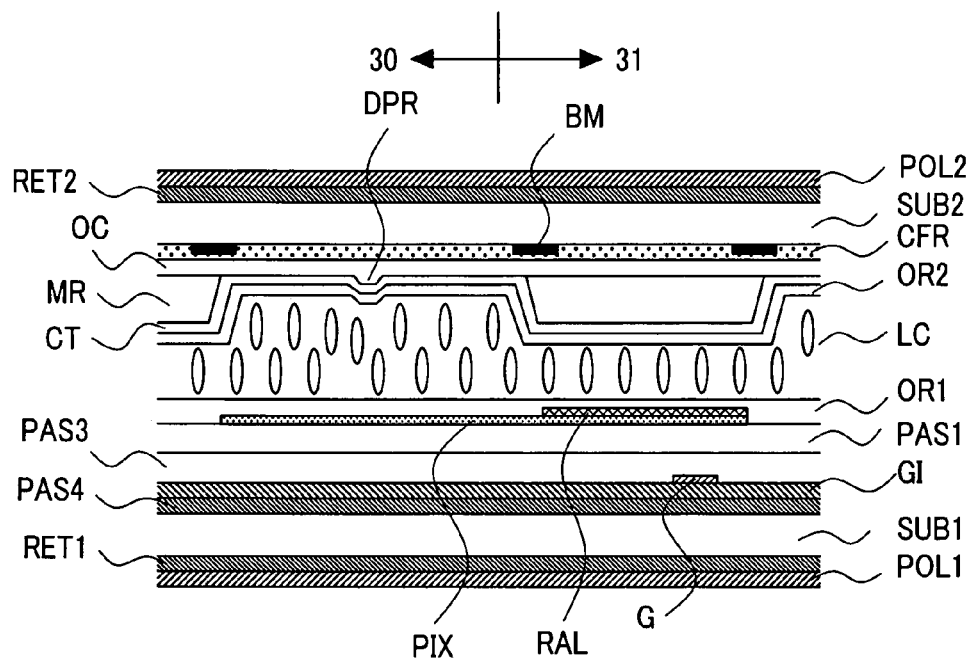
FIG. 22 shows the essential parts of the sectional structures the transmissive part and the reflective part of the subpixel in a conventional VA type transflective liquid crystal display device.
Figure 23:
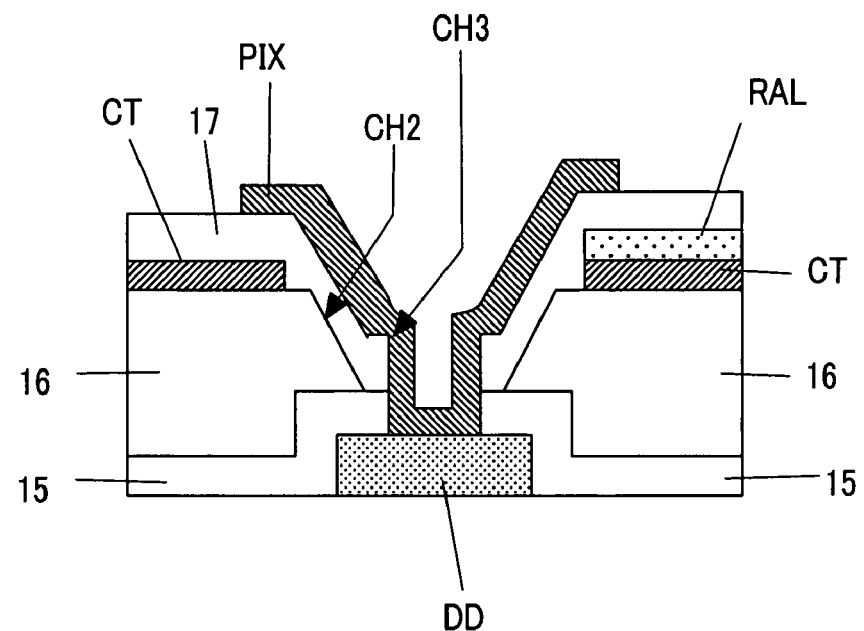
FIG. 23 shows the essential part of the sectional structure of the connecting part which electrically connects the electrode of a thin-film transistor to a pixel electrode in the pixel part of the liquid crystal panel in the transflective liquid crystal display device of Japanese Patent Application No. 2006-109659.

FIG. 22 shows the essential parts of the sectional structures of the transmissive part and the reflective part of the subpixel in a conventional VA type transflective liquid crystal display device; reference numerals 30 and 31 in FIG. 22 respectively denote the transmissive part and the reflective part.

In the conventional VA type transflective liquid crystal display device, a pair of glass substrates (SUB1 and SUB2) are disposed with a liquid crystal layer (LC) sandwiched between them. In the transflective liquid crystal display device shown in FIG. 22, the main surface side of the glass substrate (SUB2; also referred to as a CF substrate) constitutes the observing side.

On the liquid crystal layer side of the glass substrate (SUB2), a shading film (BM), a red/green/blue color filter layer (CFR), a protective film (OC), a level gap forming layer (MR), an orientation control stud (DPR), a counter electrode (CT) and an orientation film (OR2) are formed in that order from the glass substrate (SUB2) toward the liquid crystal layer (LC). Outside the glass substrate (SUB2), a phase differential plate (RET2) and a polarizing plate (POL2) are arranged.

On the liquid crystal layer side of the glass substrate (SUB1; also referred to as a TFT substrate), an insulating film (PAS4), a gate insulating film (GI), a scanning line (G), an inter-layer insulating film (PAS3), an image line, an inter-layer insulating film (PAS1), a pixel electrode (PIX), a reflective electrode (RAL) and an orientation film (OR1) are formed in that order from the glass substrate (SUB1) toward the liquid crystal layer (LC). Outside the glass substrate (SUB1), a phase differential plate (RET1) and a polarizing plate (POL1) are arranged.

In this embodiment, the planar pixel electrode (PIX) is formed on the substrate (SUB1) side, the counter electrode (CT) is formed in a planar shape on the glass substrate (SUB2) side for common use, and the liquid crystal layer (LC) is varied in orientation by a vertical electric field formed between the pixel electrode (PIX) and the counter electrode (CT). The liquid crystal layer (LC) is vertical in initial orientation, and the liquid crystal molecules are so arrayed with an inclination as to be made parallel to the substrate by the vertical electric field. Incidentally, the direction in which the liquid crystal molecules are inclined is regulated by a device for controlling the orientation, for instance the orientation control stud (DPR).

Figure 18:
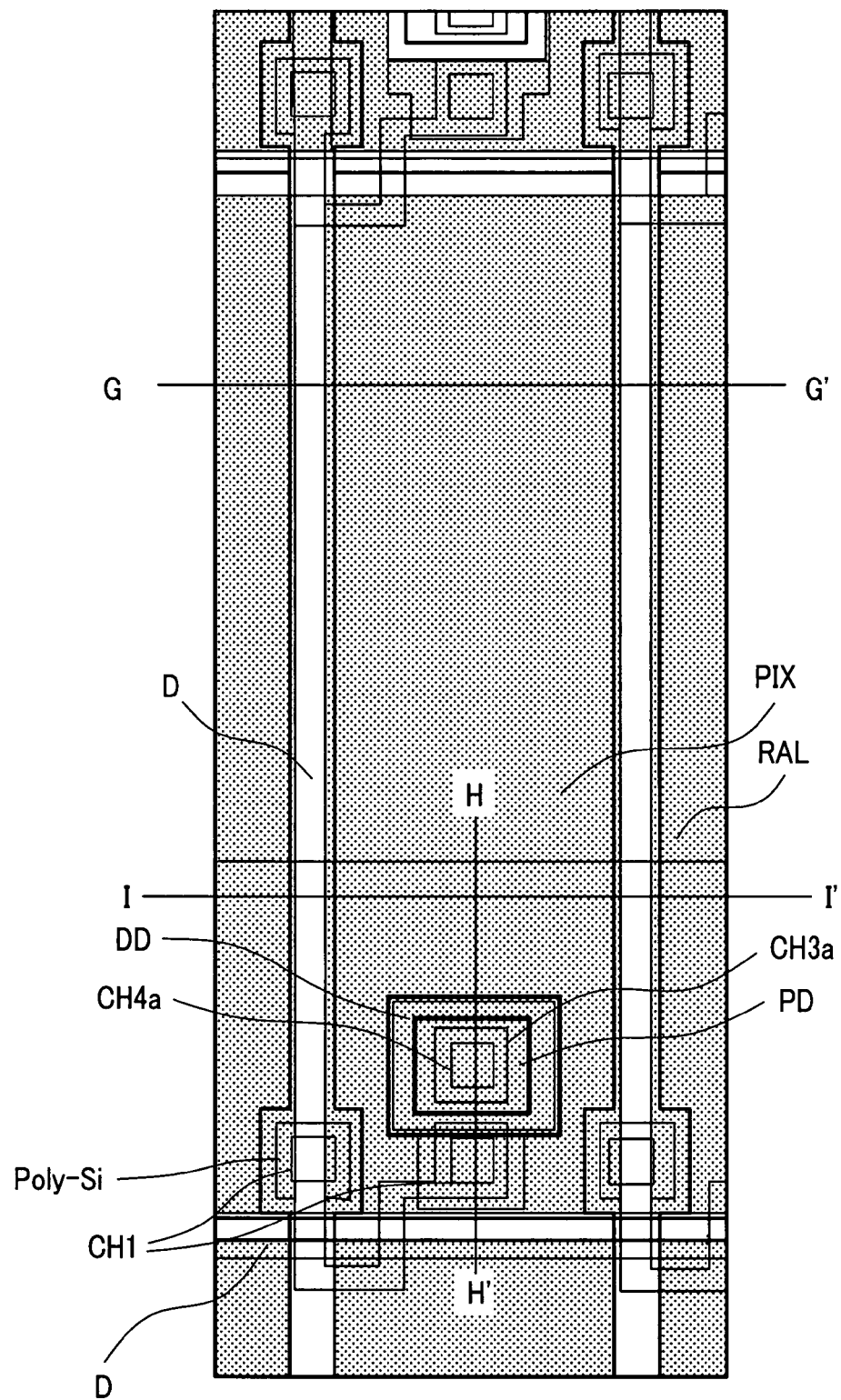
FIG. 18 shows a plan of the electrode structure of the subpixel in the transflective liquid crystal display device, which is a third embodiment of the invention.
Figure 19:
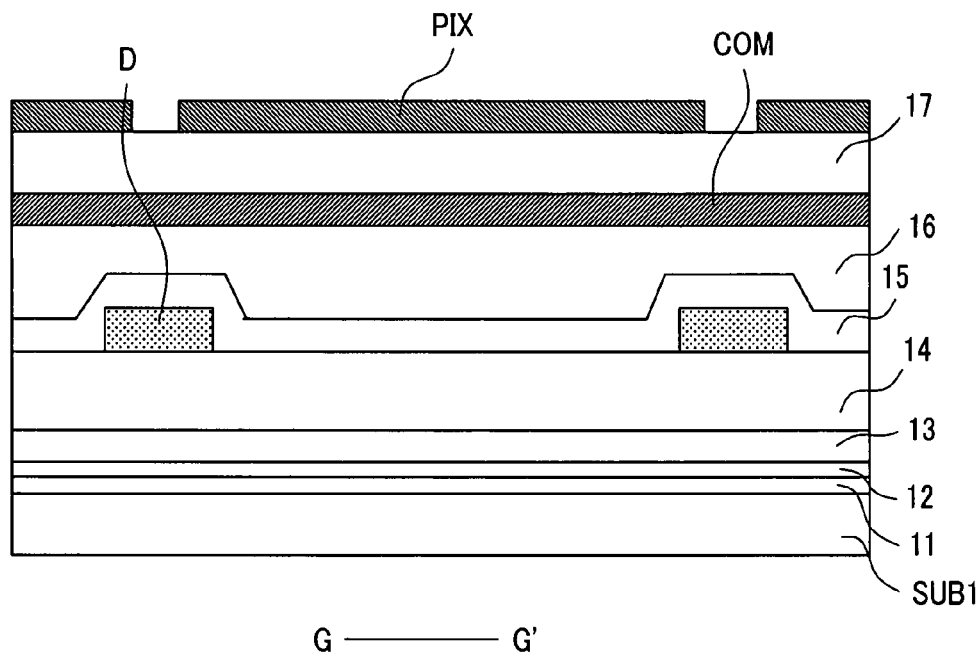
FIG. 19 shows the essential part of a sectional structure along line G-G' in FIG. 18.
Figure 20:
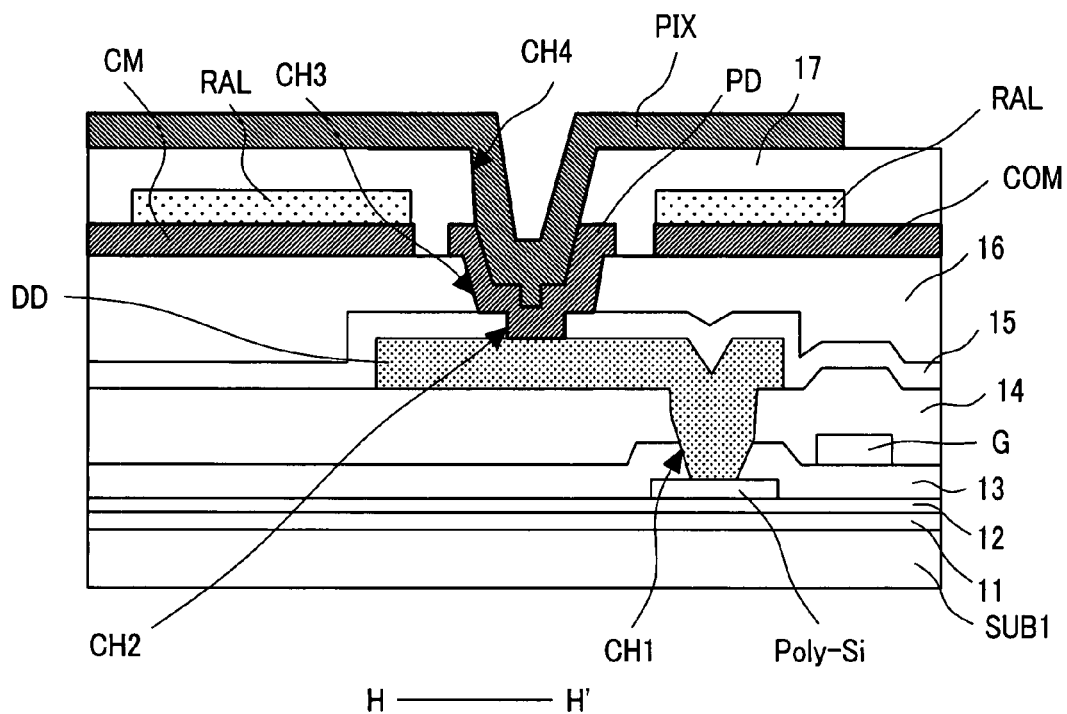
FIG. 20 shows the essential part of a sectional structure along line H-H' in FIG. 18.
Figure 21:
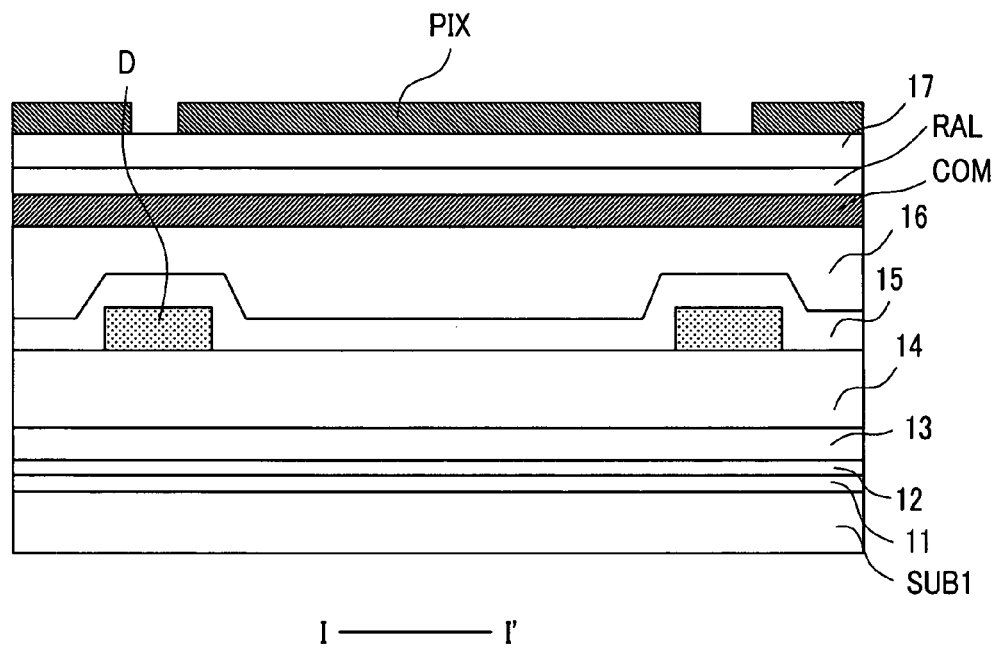
FIG. 21 shows the essential part of a sectional structure along line I-I' in FIG. 18.

FIG. 18 through FIG. 22 pertain to a transflective liquid crystal display device, which is a third embodiment of the invention, wherein FIG. 18 shows a plan of the electrode structure of the subpixel in the transflective liquid crystal display device; FIG. 19, the essential part of a sectional structure along line G-G' in FIG. 18; FIG. 20, the essential part of a sectional structure along line H-H' in FIG. 18: and FIG. 21, the essential part of a sectional structure along line I-I' in FIG. 18.

The transflective liquid crystal display device of this third embodiment is an example of application of a vertical electric field system, such as the TN system, the ECB system or the VA system to a transflective liquid crystal display device.

Incidentally, illustration of the configuration on the glass substrate (SUB2) side is dispensed with since it is the same as or resembles the transflective liquid crystal display device shown in FIG. 22, but it is to be noted that the counter electrode (CT) in this embodiment is arranged on the glass substrate (SUB2) side opposite the glass substrate (SUB1) over which the pixel electrode (PIX) is formed. To add, the counter electrode (CT) may be either split for each display line or formed over a single face.

The transflective liquid crystal display device of this third embodiment differs from the conventional vertical electric field system in the following two respects.

(1) A common electrode (COM) is formed underneath the pixel electrode (PIX) to constitute a holding capacitance.

(2) Non-splitting of the common electrode (COM) underneath the pixel electrode (PIX) for each pixel results in shielding of the electric field generated underneath the common electrode (COM) (e.g. an electric field from the image line (D)) by the common electrode (COM).

Incidentally, a reflective electrode (RAL) is superposed over the common electrode (COM), and no film is present between the common electrode (COM) and the reflective electrode (RAL).

This third embodiment configured in this way, too, can contribute to enhancing the manufacturing yield and improving the display quality of transflective liquid crystal display devices as does the foregoing first embodiment.

To add, though Japanese Patent Application Laid-Open Publication No. H5-127195 cited above describes the arrangement of a shield electrode consisting of a transparent electroconductive film in a liquid crystal display device of a vertical electric field and formation of a capacitance element between this electrode and the pixel electrode, this Japanese Patent Application Laid-Open Publication No. H5-127195 includes no reference to a transflective liquid crystal display device and, moreover, does not disclose a configuration in which the electrodes of active elements to the pixel electrode via the electroconductor (PD), which constitutes a significant feature of every one of the embodiments described above.

Although the invention made by the present inventor has been hitherto described with reference to the embodiments thereof, the invention is not limited to these embodiments, but obviously can be modified in various ways without deviating from its essentials.

For instance, though the first embodiment through the third embodiment represent cases in which inter-layer insulating films 15 and 16 are disposed between the electrodes (DD) of the thin-film transistors and the counter electrode (CT) or the common electrode (COM), the invention can as well be applied to a case in which the inter-layer insulating film 15 is absent, namely a case in which there is only the inter-layer insulating film 16.

What is claimed is:

1. A transflective liquid crystal display device including a liquid crystal display panel having a pair of substrates and a liquid crystal layer held between the pair of substrates, the liquid crystal display panel having a plurality of subpixels each having a transmissive part and a reflective part, wherein one of the pair of substrates comprises:
    an active element;
    a first insulating film disposed in a higher layer than the electrode of the active element, the first insulating film having a first contact hole;
    a counter electrode disposed in a higher layer than the first insulating film;
    a reflective electrode disposed in the reflective part in a higher layer than the counter electrode;
    a second insulating film disposed in a higher layer than the counter electrode and the reflective electrode, the second insulating film having a second contact hole;
    a pixel electrode disposed in a higher layer than the second insulating film; and
    an electroconductor formed in the first contact hole, the electroconductor being electrically connected to the electrode of the active element, and
    the pixel electrode is electrically connected to the electroconductor via the second contact hole, and
    wherein the electroconductor is formed inside and outside the first contact hole all over.

2. The transflective liquid crystal display device, according to claim 1, wherein the electrode of the active element is formed of a material that is etched with the etchant or etching gas for the reflective electrode.

3. The transflective liquid crystal display device according to claim 1, wherein the pixel electrode is arranged superposed over the counter electrode; and
    the pixel electrode, the second insulating film and the counter electrode together constitute a holding capacitance.

4. The transflective liquid crystal display device according to claim 1, wherein each of the plurality of subpixels has the pixel electrode shared between the transmissive part and the reflective part;
    the counter electrodes independent for the transmissive part and the reflective part; and
    the driving voltages applied to the counter electrodes differ between the transmissive part and the reflective part.

5. A transflective liquid crystal display device including a liquid crystal display panel having a pair of substrates and a liquid crystal layer held between the pair of substrates, the liquid crystal display panel having a plurality of subpixels each having a transmissive part and a reflective part, wherein one of the pair of substrates comprises:
    an active element;
    a first insulating film disposed in a higher layer than the electrode of the active element, the first insulating film having a first contact hole;
    a counter electrode disposed in a higher layer than the first insulating film;
    a reflective electrode disposed in the reflective part in a higher layer than the counter electrode;
    a second insulating film disposed in a higher layer than the counter electrode and the reflective electrode, the second insulating film having a second contact hole;
    a pixel electrode disposed in a higher layer than the second insulating film; and
    an electroconductor formed in the first contact hole, the electroconductor being electrically connected to the electrode of the active element, and
    the pixel electrode is electrically connected to the electroconductor via the second contact hole, and
    wherein the one substrate has a third insulating film disposed in a higher layer than the electrode of the active element and in a lower layer than the first insulating film;
    the third insulating film has a third contact hole; and
    the electroconductor is electrically connected to the electrode of the active element via the first and third contact holes.

6. The transflective liquid crystal display device according to claim 5, wherein the electrode of the active element is formed of a material that is etched with the etchant or etching gas for the reflective electrode.

7. The transflective liquid crystal display device according to claim 5, wherein the pixel electrode is arranged superposed over the counter electrode; and
    the pixel electrode, the second insulating film and the counter electrode together constitute a holding capacitance.

8. The transflective liquid crystal display device according to claim 5, wherein each of the plurality of subpixels has the pixel electrode shared between the transmissive part and the reflective part;
    the counter electrodes independent for the transmissive part and the reflective part; and
    the driving voltages applied to the counter electrodes differ between the transmissive part and the reflective part.

9. A transflective liquid crystal display device including a liquid crystal display panel having a pair of substrates and a liquid crystal layer held between the pair of substrates, the liquid crystal display panel having a plurality of subpixels each having a transmissive part and a reflective part, wherein one of the pair of substrates comprises:
- an active element;
- a first insulating film disposed in a higher layer than the electrode of the active element, the first insulating film having a first contact hole;
- a counter electrode disposed in a higher layer than the first insulating film;
- a reflective electrode disposed in the reflective part in a higher layer than the counter electrode;
- a second insulating film disposed in a higher layer than the counter electrode and the reflective electrode, the second insulating film having a second contact hole;
- a pixel electrode disposed in a higher layer than the second insulating film; and
- an electroconductor formed in the first contact hole, the electroconductor being electrically connected to the electrode of the active element, and
- the pixel electrode is electrically connected to the electroconductor via the second contact hole, and
- wherein the electroconductor is formed at the same step as the counter electrode and electrically separated from the counter electrode.

10. The transflective liquid crystal display device according to claim 9, wherein the electrode of the active element is formed of a material that is etched with the etchant or etching gas for the reflective electrode.

11. The transflective liquid crystal display device according to claim 9, wherein the pixel electrode is arranged superposed over the counter electrode; and
the pixel electrode, the second insulating film and the counter electrode together constitute a holding capacitance.

12. The transflective liquid crystal display device according to claim 9, wherein each of the plurality of subpixels has the pixel electrode shared between the transmissive part and the reflective part;
the counter electrodes independent for the transmissive part and the reflective part; and
the driving voltages applied to the counter electrodes differ between the transmissive part and the reflective part.

13. A transflective liquid crystal display device including a liquid crystal display panel having a pair of substrates and a liquid crystal layer held between the pair of substrates, the liquid crystal display panel having a plurality of subpixels each having a transmissive part and a reflective part, wherein one of the pair of substrates comprises:
- an active element;
- a first insulating film disposed in a higher layer than the electrode of the active element, the first insulating film having a first contact hole;
- a counter electrode disposed in a higher layer than the first insulating film;
- a reflective electrode disposed in the reflective part in a higher layer than the counter electrode;
- a second insulating film disposed in a higher layer than the counter electrode and the reflective electrode, the second insulating film having a second contact hole;
- a pixel electrode disposed in a higher layer than the second insulating film; and
- an electroconductor formed in the first contact hole, the electroconductor being electrically connected to the electrode of the active element, and
- the pixel electrode is electrically connected to the electroconductor via the second contact hole, and
- wherein the electrode of the active element contains in the surface thereof 1% or more of the material of the reflective electrode.

14. The transflective liquid crystal display device according to claim 13, wherein the electrode of the active element is formed of a material that is etched with the etchant or etching gas for the reflective electrode.

15. The transflective liquid crystal display device according to claim 13, wherein the pixel electrode is arranged superposed over the counter electrode; and
the pixel electrode, the second insulating film and the counter electrode together constitute a holding capacitance.

16. The transflective liquid crystal display device according to claim 13, wherein each of the plurality of subpixels has the pixel electrode shared between the transmissive part and the reflective part;
the counter electrodes independent for the transmissive part and the reflective part; and
the driving voltages applied to the counter electrodes differ between the transmissive part and the reflective part.

17. A transflective liquid crystal display device including a liquid crystal display panel having a pair of substrates and a liquid crystal layer held between the pair of substrates, the liquid crystal display panel having a plurality of subpixels each having a transmissive part and a reflective part, wherein one of the pair of substrates comprises:
- an active element;
- a first insulating film disposed in a higher layer than the electrode of the active element, the first insulating film having a first contact hole;
- a counter electrode disposed in a higher layer than the first insulating film;
- a reflective electrode disposed in the reflective part in a higher layer than the counter electrode;
- a second insulating film disposed in a higher layer than the counter electrode and the reflective electrode, the second insulating film having a second contact hole;
- a pixel electrode disposed in a higher layer than the second insulating film; and
- an electroconductor formed in the first contact hole, the electroconductor being electrically connected to the electrode of the active element, and
- the pixel electrode is electrically connected to the electroconductor via the second contact hole, and
- wherein the reflective part is provided with a phase differential plate.

18. The transflective liquid crystal display device according to claim 17, wherein the electrode of the active element is formed of a material that is etched with the etchant or etching gas for the reflective electrode.

19. The transflective liquid crystal display device according to claim 17, wherein the pixel electrode is arranged superposed over the counter electrode; and
the pixel electrode, the second insulating film and the counter electrode together constitute a holding capacitance.

20. The transflective liquid crystal display device according to claim 17, wherein each of the plurality of subpixels has the pixel electrode shared between the transmissive part and the reflective part; and
the driving voltages applied to the counter electrodes differ between the transmissive part and the reflective part.

* * * * *